US012805555B2

(12) United States Patent
Tachet et al.

(10) Patent No.: US 12,805,555 B2
(45) Date of Patent: Nov. 24, 2026

(54) METHOD FOR ENRICHING FOOD PRODUCTS WITH PROTEINS AND/OR WITH FOOD SUPPLEMENTS

(71) Applicant: JEAN MARC TACHET CRÉATION, Dolomieu (FR)

(72) Inventors: Jean-Marc Tachet, Dolomieu (FR); Philippe Pouillart, Beauvais (FR); Cécile Buche, Beauvais (FR); Alexia Franquin, Sainte Foy les Lyon (FR); Francois Buche, Beauvais (FR)

(73) Assignee: JEAN MARC TACHET CREATION, Dolomieu (FR)

( * ) Notice: Subject to any disclaimer, the term of this patent is extended or adjusted under 35 U.S.C. 154(b) by 674 days.

(21) Appl. No.: 17/436,937

(22) PCT Filed: Mar. 5, 2020

(86) PCT No.: PCT/FR2020/050457
§ 371 (c)(1),
(2) Date: Sep. 7, 2021

(87) PCT Pub. No.: WO2020/183095
PCT Pub. Date: Sep. 17, 2020

(65) Prior Publication Data

US 2022/0151277 A1 May 19, 2022

(30) Foreign Application Priority Data

Mar. 8, 2019 (FR) ....................................... 1902371

(51) Int. Cl.
*A23L 33/175* (2016.01)
*A23L 33/00* (2016.01)
*A23L 33/18* (2016.01)

(52) U.S. Cl.
CPC ............. *A23L 33/175* (2016.08); *A23L 33/18* (2016.08); *A23L 33/40* (2016.08)

(58) Field of Classification Search
CPC ........ A23L 33/175; A23L 33/18; A23L 33/40; A23L 33/10; A23L 33/29; A23L 33/17;
(Continued)

(56) References Cited

U.S. PATENT DOCUMENTS 1,637,068 A * 7/1927 Willison ............... A23L 3/0155 426/632
1,666,551 A * 4/1928 Butler .................... A23B 7/157 426/321
(Continued)

FOREIGN PATENT DOCUMENTS

CN 109330002 A * 2/2019
EP 0072263 A2 2/1983
(Continued)

OTHER PUBLICATIONS

Evidentiary reference, USDA [Miso, FoodData Central (2019)], p. 10-11. (Year: 2019).*
(Continued)

*Primary Examiner* — Erik Kashnikow
*Assistant Examiner* — Luis Eugenio Diou Berdecia
(74) *Attorney, Agent, or Firm* — Arrigo, Lee, Guttman & Mouta-Bellum LLP

(57) ABSTRACT

The present invention relates to a method for enriching a food with isolated amino acid(s) and/or with peptide(s) and/or with protein(s) and/or with dietary supplement(s), comprising the following steps:
Obtaining a food matrix permeable to liquids;
Placing said matrix in contact with an impregnation solution composed of a liquid, comprising at least one isolated amino acid and/or peptide and/or protein and/
(Continued)

or dietary supplement, to which has optionally been added at least one plant and/or spice and/or aroma;

Impregnating said matrix with said isolated amino acid(s) and/or peptide(s) and/or protein(s) and/or dietary supplement(s), by applying an under-pressure comprised between 5 and 20 millibars to the matrix in its impregnation solution.

13 Claims, 12 Drawing Sheets

(58) Field of Classification Search

CPC .......... A23L 15/20; A23L 15/30; A23L 13/75; A23J 1/00; A23J 1/14; A23J 3/08; A23J 3/16; A23J 3/227; A23P 20/11; A23P 20/17; A23V 2200/308; A23V 2200/31; A23V 2200/316; A23V 2200/318; A23V 2200/32; A23V 2200/328; A23V 2200/33; A23V 2200/332; A23V 2250/54; A23V 2250/55; A23V 2250/70; A23V 2250/7106; A23V 2250/7052; A23V 2300/02; A23V 2250/06

USPC ......... 426/656, 442, 468, 506, 323, 89, 431, 426/425, 429, 281, 519, 304, 293, 102, 426/321, 308, 302; 99/473, 516, 472, 99/487

See application file for complete search history.

(56) References Cited

U.S. PATENT DOCUMENTS 1,890,475 A * 12/1932 Todd ....................... A23P 10/00 137/527
2,052,709 A * 9/1936 Lieber ..................... A23L 3/185 99/473
2,419,877 A * 4/1947 Birdseye .............. A23B 7/0215 426/615
2,702,248 A * 2/1955 Guadagni ............ A23B 7/0441 426/270
2,801,925 A * 8/1957 Fisher ...................... A23B 7/08 426/321
2,848,333 A * 8/1958 Fisher ...................... A23B 7/08 426/321
2,865,758 A * 12/1958 Weckel .................... A23B 7/08 426/639
3,476,078 A * 11/1969 King ........................ A23B 7/08 118/30
3,623,893 A * 11/1971 Mauge ................... A23B 7/157 426/321
3,758,256 A * 9/1973 Terada ..................... A23B 5/18 426/281
3,778,519 A * 12/1973 Taralli et al. ............ A23G 1/06 426/631
3,843,810 A * 10/1974 Fehmerling ........... A23L 3/0155 426/639
4,006,257 A * 2/1977 Kolk ........................ A23B 7/14 426/321
4,331,691 A * 5/1982 Poovaiah .............. A23B 7/158 426/321
4,353,930 A * 10/1982 Hirahara .................. A23B 7/05 426/321
4,402,988 A * 9/1983 Macfie, Jr. .............. A23L 19/03 426/281
4,460,610 A * 7/1984 Macfie, Jr. .............. A23L 19/03 426/103
4,735,813 A * 4/1988 Spinoglio ............... A23L 31/00 426/302
4,818,550 A * 4/1989 Davidson ................ A47J 47/02 99/468
5,000,972 A * 3/1991 Nafisi-Movaghar ..... A23B 7/10 426/639
5,057,332 A * 10/1991 Davidson ............... A23B 4/021 99/468
5,439,692 A * 8/1995 Guzman ................ A23B 7/022 426/321
5,595,780 A * 1/1997 Zook ....................... A23L 25/20 426/607
5,683,735 A * 11/1997 Mutsushika ............ A23L 27/12 426/534
5,718,939 A * 2/1998 Nugent .................... A23B 7/08 426/639
5,747,088 A * 5/1998 Fletcher .................... A23L 2/08 426/489
6,156,361 A * 12/2000 Gilgen .................... A23L 25/25 426/441
6,242,025 B1 * 6/2001 Lesky ..................... A23L 13/70 99/473
6,261,625 B1 * 7/2001 Pickford ................. A23L 13/03 426/654
6,440,483 B1 * 8/2002 Ghaedian ............... A23B 7/085 426/639
6,517,903 B1 * 2/2003 Schmidt .................. A23P 20/18 426/805
6,579,562 B1 * 6/2003 Darke ....................... A23J 3/22 426/507
6,991,819 B2 * 1/2006 Pannevis ................. A23L 29/06 426/282
7,915,198 B2 * 3/2011 Kros ........................ C05G 5/23 504/164
2001/0048959 A1 * 12/2001 Nishioka ............... A23K 40/30 426/641
2002/0009534 A1 * 1/2002 Voisin ................. A22C 29/043 426/643
2002/0012725 A1 * 1/2002 Carlson .................. A23B 7/154 426/615
2002/0012726 A1 * 1/2002 Anders .................. A22C 9/004 426/281
2003/0091703 A1 * 5/2003 Kuwa ..................... A23L 13/72 426/240
2004/0043113 A1 * 3/2004 Stein Von Kamienski ................ A23L 33/15 426/61
2004/0131750 A1 * 7/2004 Russell ................ A23K 20/147 426/643
2007/0059411 A1 * 3/2007 Kuwa ..................... A23L 13/62 426/240
2007/0190226 A1 * 8/2007 Yamada .................. A23L 27/21 426/656
2008/0085347 A1 * 4/2008 Mah ........................ A23L 13/70 426/281
2008/0184899 A1 * 8/2008 Richmond ............. A23B 7/148 220/212
2009/0004346 A1 * 1/2009 Estes ...................... A22C 9/005 426/281
2009/0035437 A1 * 2/2009 Bovetto ................... A23G 9/40 204/157.68
2009/0047400 A1 * 2/2009 Basker ................... A23B 7/158 426/442
2009/0297671 A1 * 12/2009 Basker .................... A23L 19/03 426/465
2010/0221397 A1 * 9/2010 Iversen ................... A23L 33/20 426/429
2010/0227030 A1 * 9/2010 Galindo ................. A23B 7/015 426/238
2010/0233331 A1 * 9/2010 Bello ..................... A23B 7/154 426/281
2010/0255163 A1 * 10/2010 Anand .................... A23L 27/00 426/281
2011/0165305 A1 * 7/2011 Lynglev .................. A23L 33/18 435/68.1
2012/0048124 A1 * 3/2012 Kirejevas ............. A23L 33/115 99/472
2012/0058225 A1 * 3/2012 Kirejevas ............... A23K 50/40 426/61

(56) References Cited

U.S. PATENT DOCUMENTS

| | | | | |
|---|---|---|---|---|
| 2012/0064205 | A1* | 3/2012 | Fujiwara | A23G 3/0082 426/531 |
| 2012/0308625 | A1* | 12/2012 | Lahousse | A22C 9/00 426/631 |
| 2013/0011524 | A1* | 1/2013 | Hareyama | A23G 1/54 426/103 |
| 2013/0078339 | A1* | 3/2013 | Trahan | A23L 3/358 426/106 |
| 2013/0101701 | A1* | 4/2013 | Berry | A23L 19/01 426/465 |
| 2013/0108754 | A1* | 5/2013 | Blanc | A47J 31/461 99/302 R |
| 2013/0129865 | A1* | 5/2013 | Goold | A23L 19/03 426/62 |
| 2013/0274339 | A1* | 10/2013 | Lurya | A61K 9/0056 426/534 |
| 2014/0154366 | A1* | 6/2014 | Miura | A23G 3/40 426/103 |
| 2014/0186501 | A1* | 7/2014 | Smit | A23C 19/16 426/582 |
| 2014/0255588 | A1* | 9/2014 | Kortschack | A23J 3/04 426/644 |
| 2015/0017297 | A1* | 1/2015 | Vastardis | A23L 33/10 426/429 |
| 2015/0223500 | A1* | 8/2015 | Lurya | A23L 5/55 426/640 |
| 2015/0313250 | A1* | 11/2015 | Itarashiki | A23B 7/02 426/321 |
| 2016/0002483 | A1* | 1/2016 | Zhao | A23B 7/16 106/18.32 |
| 2016/0029651 | A1* | 2/2016 | Chatard | A23B 7/154 426/654 |
| 2016/0135487 | A1* | 5/2016 | Michiels | A23L 29/27 426/654 |
| 2016/0165930 | A1* | 6/2016 | Michiels | A23L 29/27 426/654 |
| 2018/0168198 | A1* | 6/2018 | Petralia | A61K 36/886 |

FOREIGN PATENT DOCUMENTS

| | | | | |
|---|---|---|---|---|
| EP | 1264546 | B1 | 2/2001 | |
| FR | 2280328 | A1 | 7/1974 | |
| FR | 2807955 | A1 | 4/2000 | |
| FR | 2912035 | A1 | 2/2007 | |
| FR | 3003873 | A1 | 3/2013 | |
| JP | H05304886 | A * | 11/1993 | |
| JP | 2001238612 | A * | 9/2001 | A23L 13/62 |
| JP | 2003339328 | A * | 12/2003 | |
| JP | 2008005745 | A * | 1/2008 | |
| KR | 20030090117 | A * | 11/2003 | |
| WO | 8501420 | A1 | 4/1985 | |
| WO | WO-2008110694 | A2 * | 9/2008 | A23L 33/175 |
| WO | WO-2016058919 | A1 * | 4/2016 | A61K 31/202 |
| WO | WO-2016199766 | A1 * | 12/2016 | A23B 7/00 |
| WO | 2019/048795 | A1 | 1/2017 | |

OTHER PUBLICATIONS

Evidentiary reference, Kusumoto et al. [Japanese Traditional Miso and Koji Making (2021)], p. 9, section 4.3 Enzymes in Koji. (Year: 2021).*

Evidentiary reference, LeRoy, What is Miso? 7 Different Types & What It Tastes Like, p. 4, Nutritional Benefits of Miso. (Year: 2024).*

Pikosky [What is the difference between whey and casein proteins, 2016] US Dairy (Year: 2016).*

Chartrand et al [Influence of amino acids in dairy products on glucose homeostasis: The clinical evidence, 2017], Elsevier (Year: 2017).*

Vatankhah et al., High pressure impregnation (HPI) of apple cubes: Effect of pressure variables and carrier medium, (2018), Food Research International 116 (2019) 320-328. web: https://www.sciencedirect.com/science/article/pii/S096399691830663X (Year: 2018).*

Influence of Amino Acids in Dairy Products on Glucose Homeostasis_ The Clinical Evidence 2017 (Year: 2017).*

Zhao et al. [Practical applications of vacuum impregnation in fruit and vegetable processing, 2004], p. 434-451 (Year: 2004).*

Paes et al. Vacuum impregnation of apples, 2008, p. 799-806 (Year: 2008).*

Tzia et al. Zeolites in Food Processing Industries. Handbook of Natural Zeolites, 2012, 601-651.

Rieu et al. Leucine supplementation improves muscle protein synthesis in elderly men independently of hyperaminoacidaemia. Journal of Physiology. 2006. 305-315.

Arends et al. ESPEN guidelines on nutrition in cancer patients. Clinical Nutrition. 36 (2017), 11-48.

Anses, Le proteins. Republique Francaise. Sep. 30, 2021. https://www.anses.fr/en/content/proteins.

Van Buggenhout et al., Minimizing texture loss of frozen strawberries: effect of infusion with pectinmethylesterase and calcium combined with different freezing conditions and effect of subsequent storage/thawing conditions, Eur Food Res Technol (2006) 223: 395-404.

Yang et al., Effects of Vacuum Impregnation with CalciumLactate and Pectin Methylesterase on Quality Attributes and Chelate-Soluble Pectin Morphology of Fresh-Cut Papayas, Food Bioprocess Technol (2017) 10:901-913.

* cited by examiner

METHOD FOR ENRICHING FOOD PRODUCTS WITH PROTEINS AND/OR WITH FOOD SUPPLEMENTS

FIELD OF THE INVENTION

The present invention relates to a method intended to enrich foods with amino acids and/or with peptides and/or with proteins and/or with dietary supplements (nutrients and/or culinary aids) with an aim of improving the nutritional state and/or health, notably of human beings.

PRIOR ART

Undernutrition is a pathological state that is characterised by loss of weight, and notably of muscular mass (even in obese persons), following an imbalance between the nutritional intake and the energy expenditure of an organism. The causes are various, such as advancing age, an organic, psychiatric or social affection, as well as a consequence of the taking of medicines or, of a surgical intervention. In France, among the 2 million undernourished persons, a high proportion is constituted of patients having a loss of appetite linked to ageing or to a medical treatment.

The clinical diagnosis of undernutrition (by Mini Nutritional Assessment, Nutritional Risk Index, or any other score) is mainly based on the observation of variations in weight and body mass index (BMI); nutritional assessments (for example by determination of the level of albumin and blood prealbumin) may also be carried out to compare the nutritional intake and energy expenditure of a person, and to establish from where the imbalance between the two arises.

The negative consequences of undernutrition are numerous. Undernutrition aggravates the prognosis faced with a disease, notably in the case of persons suffering from cancer. It is considered that 5 to 25% of the mortality due to cancer is directly linked to the undernutrition of the patient, which occurs very early in the course of the disease. In elderly persons, the reduction in muscular mass may affect the autonomy of the individual. Sarcopenia (muscle wasting) is one of the most frequent disorders. This affection, characterised by a progressive loss of strength and skeletal muscular mass, affects 5 to 10% of persons 65 years and older. Generally speaking, undernutrition induces an alteration of the general state, and exposes sufferers to risks of psychic disorders, digestive disorders, falls and fractures.

The treatment of undernutrition consists in preventive efforts, notably in fragile persons, such as the elderly or hospitalised persons. The aim is to increase their nutritional intake of amino acids, peptides and/or proteins and nutrients (vitamins, minerals, essential acids), in order to maintain muscular mass.

However, it is illusory to make sick people, such as those suffering from cancer, who are asthenic, anorexic, malnourished and weakened, eat important quantities of proteins in the form of meat, the most "efficient" source of proteins.

Thus, administration of a nutritional supplementation often proves to be necessary.

This supplementation consists in particular of nutritional supplements containing certain amino acids.

For example, L-citrulline, an amino acid that effects protein and energy metabolisms, is the only amino acid to escape splanchnic extraction. High citrullinemia is associated with a 25% increase in the rate of muscular protein synthesis in healthy humans, and preserves muscular mass and physical performance in the elderly.

Leucine may also be cited, an amino acid commonly used to supplement the diet of seniors, who metabolise it better than the whole proteins comprising it.

Apart from amino acids, peptides and proteins, other compounds of nutritional interest may be administered in the form of supplements taken by oral route: they are what is commonly and generically designated "dietary supplements", which act directly or indirectly as adjuvants of protein anabolism (vitamins, minerals, essential fatty acids, sugars).

Certain vitamins play an important role in protein anabolism. For example, vitamin D, in its active calcitriol form (vitamin D3), prevents inflammation and its proteolytic effects. Vitamin B6 also has a vital role in the assimilation of proteins, which explains why it is recommended for combatting muscular fatigue.

But the oral nutritional supplements (ONS) proposed by the food processing or pharmaceutical industries, notably enriched with essential amino acids (notably leucine or other "BCAAs" (Branched Chain Amino Acids), are difficult to accept by the sick due to their texture and their not very pleasant taste. In addition, the cost of these supplements remains very high.

Target Populations

Several populations may benefit from the consumption of foods enriched with amino acids/peptides/proteins/dietary supplements. They are notably persons suffering from cancer; persons suffering from type 2 diabetes; and persons suffering from dermatological affections (bedsores, burns) requiring a healing aid. Healthy populations may also benefit from the consumption of foods with high nutritional value, such as for example athletes and astronauts, who wish to increase or maintain their muscular mass.

In the course of a cancer treatment, certain persons experience eating difficulties, linked notably to iatrogenic symptoms (called "secondary effects" of chemotherapy, immunotherapy, radiotherapy, hormonotherapy treatments, surgery) such as nausea, vomiting, systemic or local inflammations such as buccal, oesogastric and intestinal inflammations, constipation, diarrhoea, bloating, dysphagia, fatigue, dysgeusia, dysosmia, etc. Yet, in the course of treatment, it is important to prevent (i) loss of weight and muscular mass (ii) catabolic inflammation, and (iii) any deficiency in vitamins, minerals, trace elements, sugars and anti-inflammatory and consequently anti-proteolytic essential fatty acids.

According to studies on the field, 54 to 81% of persons affected by cancer use dietary supplements (vitamins, herbs, plants, etc.).

Their expectations notably concern:

an increase in the chances of healing;

a reduction in side effects caused by the treatments and a better quality of life;

a post-interventional hepatic detoxification.

These dietary supplements, often compounds of plant or mineral origin, are proposed as adjuvants to conventional therapies, such as surgery, chemotherapy, immunotherapy, hormonotherapy and radiotherapy.

A second population of patients able to benefit from the consumption of foods enriched with amino acids and/or peptides and/or proteins and/or dietary supplements is the population of patients with type 2 diabetes.

Type 2 diabetes results from an accumulation of glucose in the blood. Glycaemia is regulated via insulin, a hormone secreted by the pancreas when the glucose content in the blood is too high. It acts by attaching itself to receptors situated on the wall of the cells of the organism, which activates the capture and the storage of glucose therein.

During type 2 diabetes, the cells become less sensitive to insulin: initially, the pancreas increases its production, which leads to its exhaustion. Insulin is then no longer produced in sufficient quantity to meet the needs of the organism, and the glucose content increases abnormally in the blood. Type 2 diabetes is installed. The chronic hyperglycaemia that results therefrom has harmful long term effects on the heart, the eyes, the nervous system, etc.

Among the different interventions making it possible to control glycaemia in the elderly, maintaining muscular mass seems to be a priority. This requires regular physical activity but also sufficient intakes of amino acids which favour the endogenous synthesis of proteins.

The potential effects of the intake of amino acids in the form of supplementation have been tested on diabetic patients. Its application to subjects more than 65 years old with type II diabetes has just been validated. This placebo controlled randomised crossover study was conducted on 34 persons aged from 65 to 83 years old for whom type II diabetes had been diagnosed for 5 to 15 years. Their body mass index was within the average of their generation, comprised between 18 and 23. Their glycated haemoglobin content was high, above 7%. Twenty five patients were treated by oral hypoglycaemics and 9 by recombinant human insulin.

A mixture of amino acids or a placebo was administered to them by oral route at 10 am and 6 pm. This supplementation represented 8 g/day of amino acids, of which 2.5 g of leucine, 1.3 g of lysine, 1.3 g of isoleucine, 1.25 g of valine, 0.7 g of threonine, 0.3 g of cysteine, 0.3 g of histidine, 0.2 g of phenylalanine, 0.1 g of methionine, 0.06 g of tyrosine and 0.04 g of tryptophane. During the first 2 weeks, the base level of several biochemical parameters was determined. Then for 16 weeks, the subjects received a supplementation with amino acids or the placebo. After 2 weeks of rest, the placebo and treated subjects were permutated for a new period of 16 weeks.

The administration of amino acids significantly reduces the concentration of glucose on an empty stomach and during the postprandial period as of the eighth week of treatment. This effect is maintained during the final 8 weeks of treatment, the 2 weeks of rest and the 16 weeks of placebo in the course of the second crossover part of the study. Conversely, the subjects receiving a placebo during the first 16 weeks have an unchanged glycaemia whereas it decreases significantly 8 weeks after the administration of amino acids in the second phase of the study. This lowering in glycaemia has an impact on the glycated haemoglobin content which drops 8 weeks after the supplementation with amino acids and during the remainder of the study. Plasmatic insulin, which on an empty stomach is higher than average for non-diabetic subjects of the same age, is also lowered at the end of 8 weeks and in a durable manner by the intake of amino acids. The resistance to insulin assessed from plasmatic concentrations of glucose and insulin on an empty stomach is also reduced by the supplementation.

These data show that the administration of amino acids in elderly subjects with type II diabetes reduces their glycaemia and their insulinemia while reducing their resistance to insulin. Supplementation with amino acids could join the arsenal of hypoglycaemic treatments in elderly subjects having type II diabetes.

A third population of patients able to benefit from the consumption of foods enriched with amino acids and/or peptides and/or proteins and/or dietary supplements is constituted of patients presenting healing disorders.

Indeed, the healing of wounds and burns involves several nutrients such as arginine, zinc, vitamin A, vitamin E and vitamin C. Some studies suggest that a supplementation of these different nutrients could facilitate the healing of wounds, in particular, chronic wounds, bedsores or ulcers, in older patients, but also in the treatment of burns.

Among the most beneficial amino acids and vitamins may be cited the following compounds:

- Arginine makes it possible to support the synthesis of collagen and thus favours epithelialisation and closing of the wound. It favours the production of nitric oxide, which increases blood flow and favours the immune response, and the transport of other amino acids in the cells.
- Vitamin C plays a key role in tissue repair and regeneration, and also favours the absorption of iron and the activation of copper.
- Vitamin E, like vitamin C, is an antioxidant which makes it possible to neutralise oxidative stress.
- Zinc, also an anti-oxidant, favours the promotion of protein synthesis and cell growth.
- Copper, finally, is essential to the "cross-linking" of collagen fibres to regenerate tissues.

Another population able to benefit from enriched foods is the population of athletes, notably top level athletes.

Faced with a situation of physical stress or excessive effort, the body can very easily transform leucine into glucose, thus leading to a consequent drop in its intramuscular levels. When this happens, the muscle is destroyed by this catabolic action. The leucine content in the blood decreases by 30% during strength training, and between 11% and 33% in cardiovascular exercise sessions. Consequently, it is obvious that the necessary quantity of leucine is much more important for athletes. Research indicates that taking 50 milligrams of leucine per kilo of body weight and per day (around 5 grammes for a body builder weighing 100 kilos) avoids the decrease in leucine in the blood during intense training. To do so, taking this supplement or a food enriched with leucine is very useful for top athletes.

Leucine is a protein synthesis activator; indeed, it could increase the transport of messenger RNA in the muscular cells. This process takes place thanks to the capacity of leucine to stimulate the mTOR 1 complex, a primary anabolic route.

A study on weight training over 12 weeks has demonstrated that taking four grammes of leucine a day increases the force 10% more than if one trains without taking this supplement.

Finally, another population able to benefit from the consumption of enriched foods is constituted of astronauts, who are subject to weightlessness and are thus subject to muscular loss as well as reduction in bone density.

Thus, numerous populations may benefit from an enriched diet, with high nutritional value. In particular, the diet of persons of which the organism is weakened by age or by a serious surgical or medicinal treatment should advantageously be enriched (i) with proteins, peptides and/or amino acids and (ii) with dietary supplements such as vitamins, minerals, essential fatty acids, sugars, and/or detoxifying compounds for the organism.

Enriched Foods Known in the Prior Art

It has been shown that enrichment with proteins of products normally consumed by individuals, such as soup, bread, fruit juice, was an interesting alternative to nutritional supplements by oral route.

It would also be advantageous to enrich these normally consumed dietary products with dietary supplements, in order to administer them to patients, without adding a new oral dose of products presented in the form of medicines, to persons already subjected to numerous medicinal administrations.

Different dietary products enriched with proteins are available on the market, such as the industrial products (ready to use soups, bread, iced creams) of the Carezzo Nutrition Company (Netherlands). The industrial group NIZO (Netherlands) is also particularly involved in the elaboration of industrial dietary products enriched with proteins, within the scope of the actions of the "Cater with Care" partnership (https://www.caterwithcare.nl/research_innovation.htm) in collaboration with Wageningen University.

In France, the Nutrisens Company (http://www.afdn.org/fileadmin/regions/alsace/170615-undernutrition-et-enrichment.pdf) proposes a range of industrial dietary products such as creams, desserts and confectionaries. The Centre Hospitalier Universitaire de Rouen has also developed cakes and pastries enriched with proteins, declined under the name "Pati&Pro" (https://www.chu-rouen.fr/trophees-de-lagroalimentaire/).

The patent application FR 2 912 035 describes dietary products enriched with proteins, notably comprising a protein content greater than 6% by weight compared to the total weight of the food. These enriched foods are obtained by a technology of imbibition of the food with a hydro-alcoholic or aqueous solution, comprising at least one specific nutritional addition.

Within the European Union, nutritional claims are regulated by the CE N° 1924/2006 regulation. To be able to make these claims, it is imperative of respect the attribution conditions according to the targeted nutritional claim:

- "Source of Proteins" is a claim according to which a foodstuff is a source of proteins, or any other claim capable of having the same sense for the consumer, which can only be made if 12% at least of the energy value of the foodstuff is produced by proteins;
- "Rich in Proteins" is a claim according to which a foodstuff is rich in proteins, or any other claim capable of having the same sense for the consumer, which can only be made if 20% at least of the energy value of the foodstuff is produced by proteins.

Players involved in catering now seek inexpensive and simple-to-use solutions to enrich with amino acids, peptides, proteins or other nutritional compounds food matrices having a strong appetency for weakened persons, such as fruits or vegetables not cooked beforehand.

Vacuum impregnation methods have been described in numerous publications, for example in the patents FR 2 280 328, FR 2 807 955, U.S. Pat. Nos. 3,843,810 and 4,460,610.

These vacuum impregnation methods have the aim either to confer a certain texture to the food products thus impregnated, as is described in the U.S. Pat. No. 4,460,610 and the international application WO 85/01420; or to favour their conservation, as is described in the patent application EP 072 263, in particular in the impregnant of anti-oxidant products such as described in the patent application EP 1 264 546.

The patent application FR1758301, of the same applicant, describes a method for conserving foods, comprising the following steps:

a) Incubation of the raw food in an impregnation solution composed of a syrup or an oil, to which has optionally been added plants and/or spices and/or honey;

b) Conditioning of the raw food in its impregnation solution, under partial vacuum, the final under-pressure obtained being comprised between 5 and 20 millibars; and c) Conservation of the raw food in its impregnation solution, under partial vacuum, at a temperature comprised between 0° C. and 6° C.

Surprisingly, it has been shown that the first two steps (a) and (b) of this method may be adapted to enrich a food permeable to liquids with amino acid(s), peptide(s), protein(s) and/or with dietary supplement(s).

DESCRIPTION OF THE INVENTION

The aim of the invention is to enrich with isolated amino acid(s) and/or with peptide(s) and/or with protein(s) and/or with dietary supplement(s), a food matrix permeable to liquids, such as a fruit or a vegetable or a marine plant, notably with the aim of enhancing the nutritional value thereof.

As described previously, foods prepared industrially, enriched with proteins are commercially available. However, the appetency of the latter may be considered insufficient by persons wishing to prepare their meals themselves, from fresh products, or wishing to consume raw products, uncooked.

It would thus be desirable to have available untreated, non-transformed foods, enriched with amino acids, peptides, proteins, and/or dietary supplements, to satisfy the intake and the bioavailability in amino acids, peptides, proteins, vitamins or any other nutritional compound, for persons wishing to feed themselves and/or to cook from raw foods, notably fruits or vegetables, in a form the closest possible to their natural aspect.

To meet this need, according to a first aspect of the invention, a method is proposed for enriching a food with isolated amino acid(s) and/or with peptide(s) and/or with protein(s) and/or with dietary supplement(s), comprising the following steps:

- Obtaining a food matrix permeable to liquids;
- Placing said matrix in contact with an impregnation solution composed of a liquid, comprising at least one isolated amino acid and/or peptide and/or protein and/or dietary supplement, to which has optionally been added at least one plant and/or spice and/or aroma without limitation of state (vegetable water, exudates, essential oil, infusion, maceration, powder, any part of the vegetative apparatus, special pharmaceutical form, copies of organic and non-organic synthesis, etc.);
- Impregnating said matrix with said isolated amino acid(s) and/or with peptide(s) and/or with protein(s) and/or with dietary supplement(s), while applying an under-pressure comprised between 5 and 20 millibars to the matrix in its impregnation solution.

Preferably, the method of the invention will be implemented for the preparation of a food having an enhanced nutritional value compared to its original nutritional value, and/or enriched with nutrients having a beneficial activity for the health of organisms, notably human organisms.

The invention also relates to a food enriched with isolated amino acid(s) and/or with peptide(s) and/or with protein(s) and/or with dietary supplement(s), capable of being obtained by the method according to the invention.

The present invention also pertains to such a food enriched with isolated amino acid(s) and/or with peptide(s) and/or with protein(s) and/or with dietary supplement(s), for the use thereof in the treatment of the undernutrition of persons affected by this syndrome, and/or in the treatment of type 2 diabetes, and/or in the treatment of persons requiring cutaneous reconstruction.

Another use of such an enriched food will be the dietary supplementation of persons resorting to a protein-energy intake linked to their physical activity (athletes) or to their situation of weightlessness (astronauts).

The present invention also relates to such a food enriched with isolated amino acid(s) and/or with peptide(s) and/or with protein(s) and/or with dietary supplement(s) for the use thereof combined with chemotherapy and/or immunotherapy, and/or hormonotherapy, and/or radiotherapy treatments, in the treatment of cancer.

DESCRIPTION OF THE FIGURES

Other characteristics, aims and advantages of the invention will become clear from the description that follows, which is purely illustrative and non-limiting, and which should be read with regard to the appended drawings in which:

FIG. 1 illustrates the results of protein vacuum impregnation, on the mass of different food matrices, before (M1) and after (M2) impregnation.

FIG. 2 illustrates the results of protein vacuum impregnation, in terms of total quantity of nitrogen measured by the DUMAS method.

The dotted lines represent the levels necessary to make the nutritional claims "source of proteins" (lower line) and "rich in proteins" (upper line).

Figure 3A:
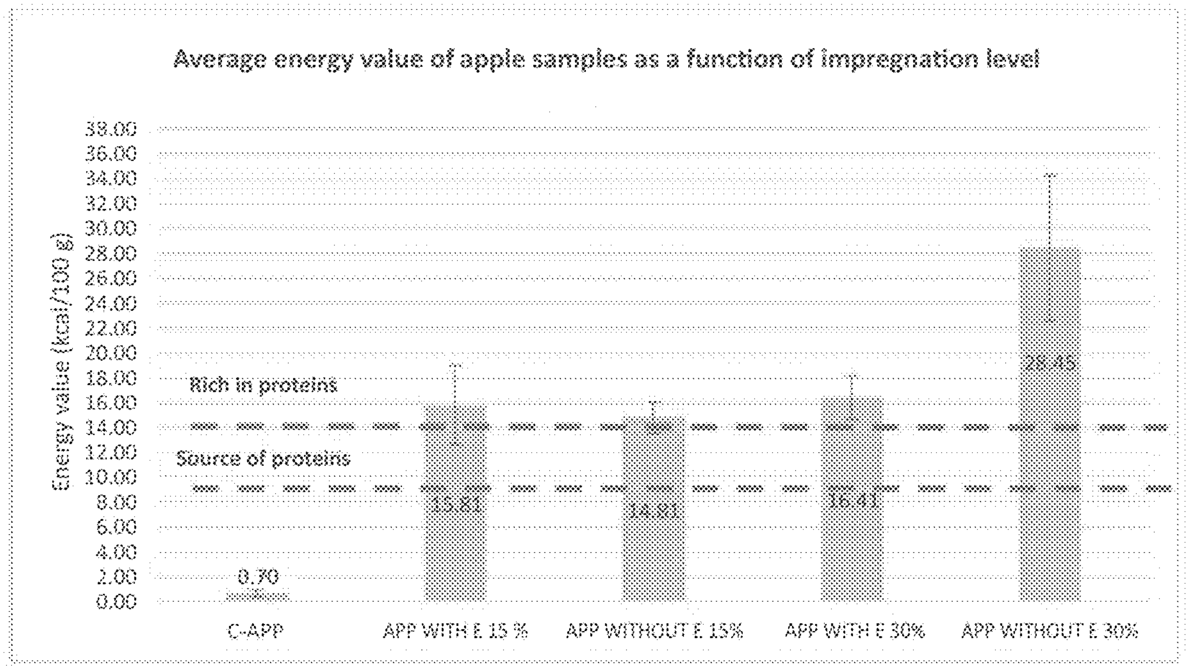
FIG. 3 illustrates the average energy value of the impregnated food samples, as a function of impregnation level, expressed in kilocalories/100 g of food.

FIG. 3*a*: Pieces of raw apple, impregnated with:
- untreated: control (on the left)
- a protein solution diluted to 15% with emulsifier (with E) and without emulsifier (without E) (middle) and
- a protein solution diluted to 30% with emulsifier (with E) and without emulsifier (without E) (on the right).

Figure 3B:
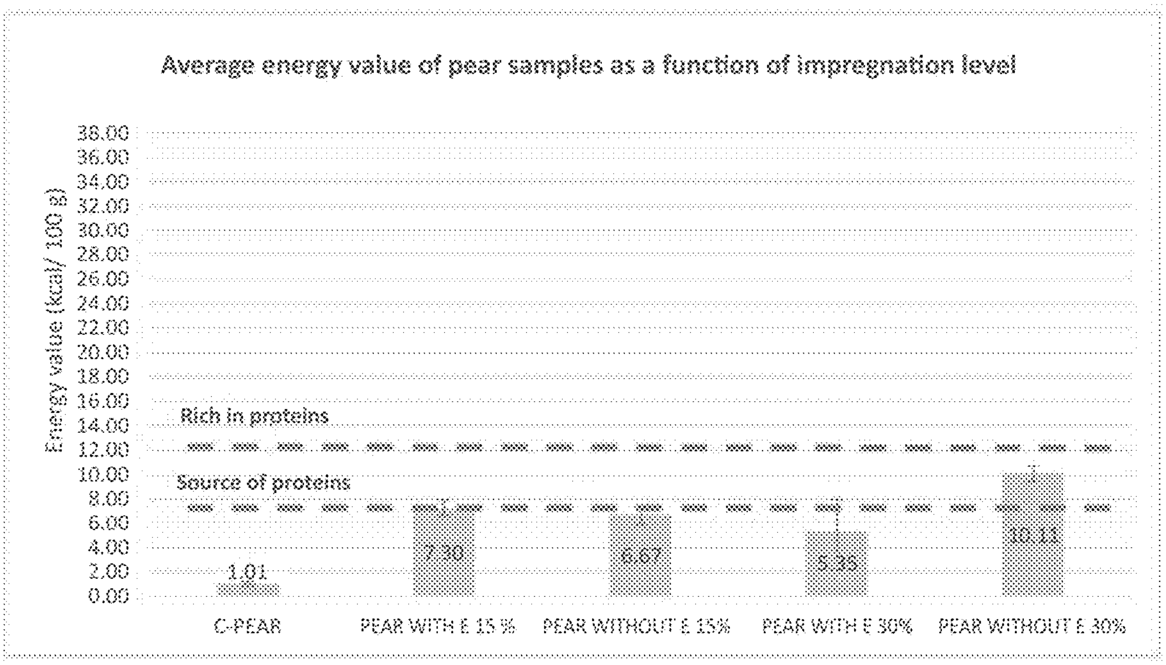

FIG. 3*b*: Pieces of raw pear, impregnated with:
- untreated: control (on the left)
- a protein solution diluted to 15% with emulsifier (with E) and without emulsifier (without E) (middle) and
- a protein solution diluted to 30% with emulsifier (with E) and without emulsifier (without E) (on the right).

Figure 3C:
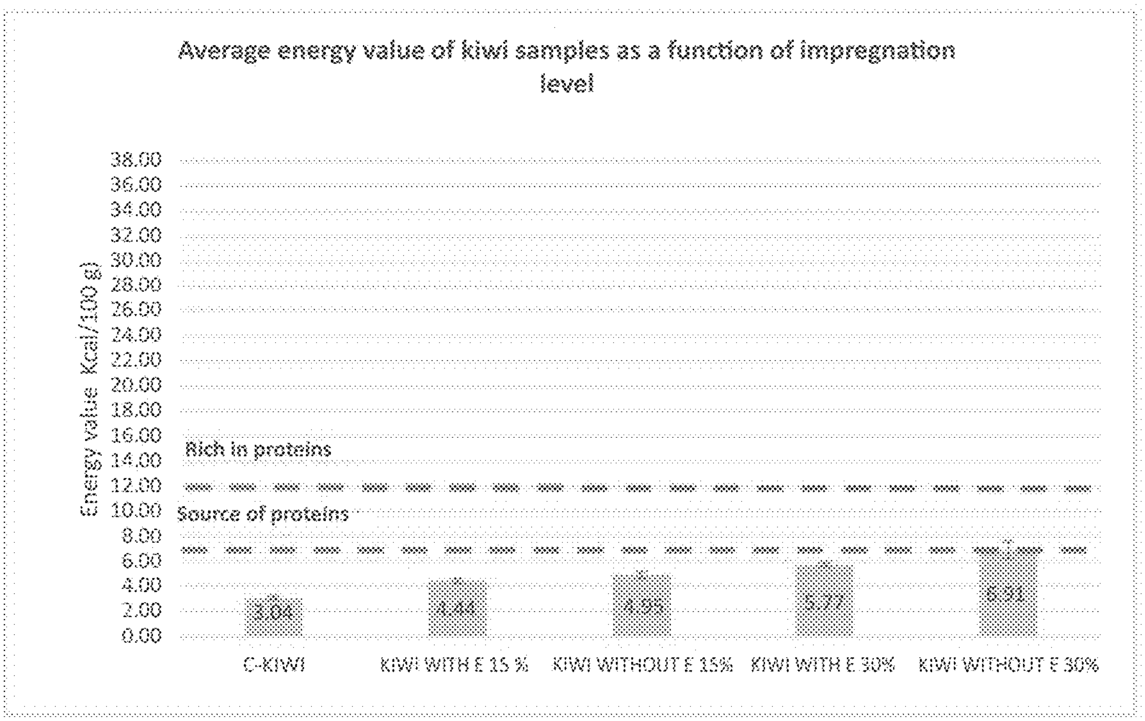

FIG. 3*c*: Pieces of raw kiwi, impregnated with:
- untreated: control (on the left)
- a protein solution diluted to 15% with emulsifier (with E) and without emulsifier (without E) (middle) and
- a protein solution diluted to 30% with emulsifier (with E) and without emulsifier (without E) (on the right).

Figure 3D:
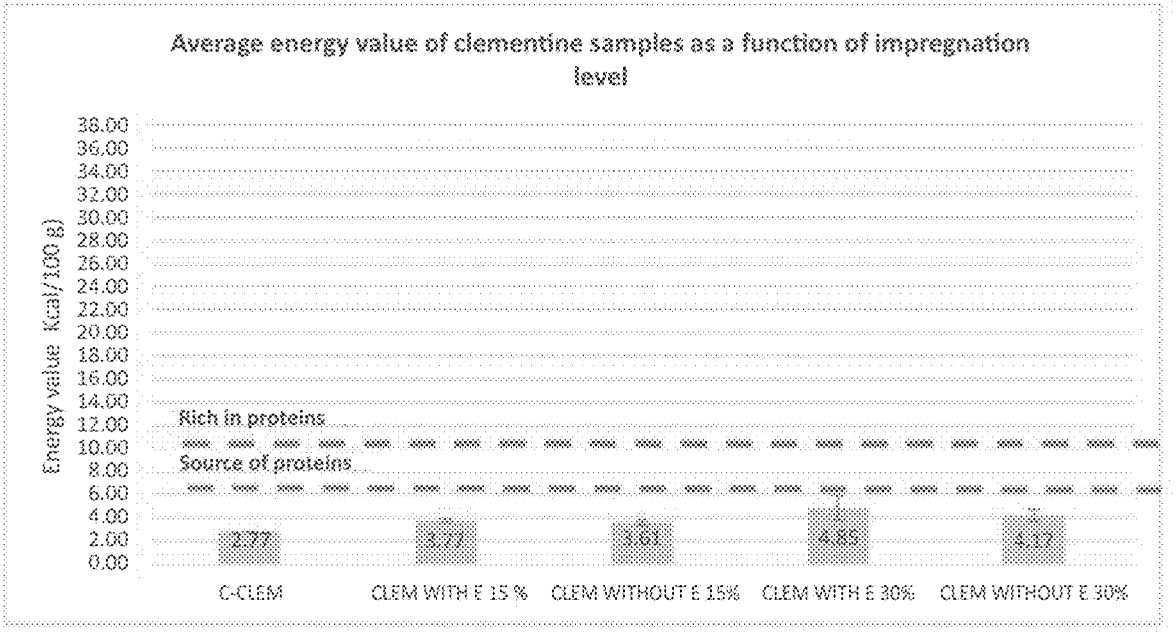

FIG. 3*d*: Pieces of raw clementine, impregnated with:
- untreated: control (on the left)
- a protein solution diluted to 15% with emulsifier (with E) and without emulsifier (without E) (middle) and
- a protein solution diluted to 30% with emulsifier (with E) and without emulsifier (without E) (on the right).

Figure 3E:
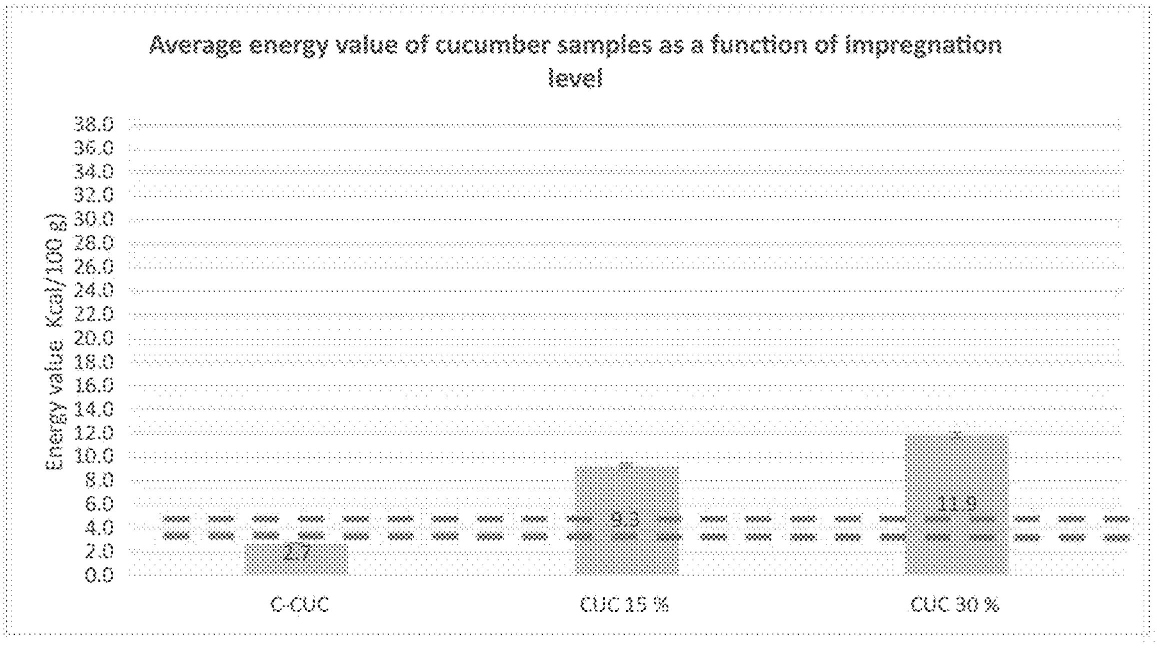

FIG. 3*e*: Pieces of raw cucumber, impregnated with:
- untreated: control (on the left)
- a protein solution diluted to 15% (middle) and
- a protein solution diluted to 30% (on the right).

Figure 3F:
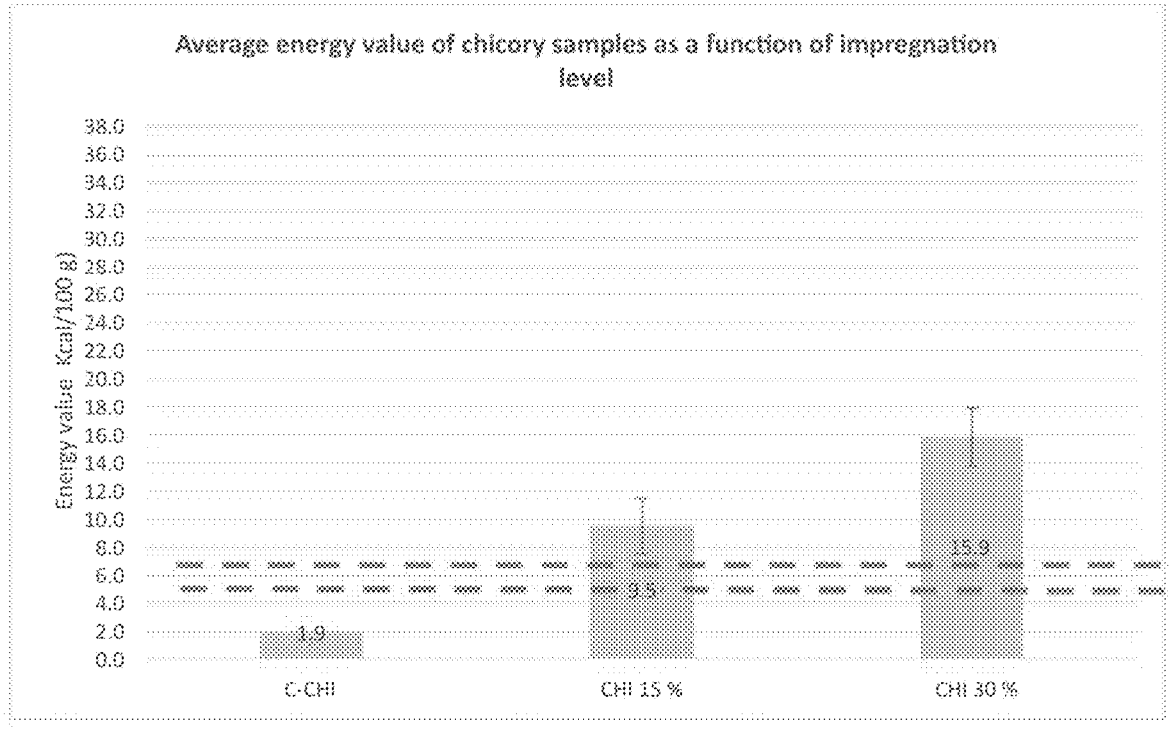

FIG. 3*f*: Pieces of raw chicory, impregnated with:
- untreated: control (on the left)
- a protein solution diluted to 15% (middle) and
- a protein solution diluted to 30% (on the right).

Figure 3G:
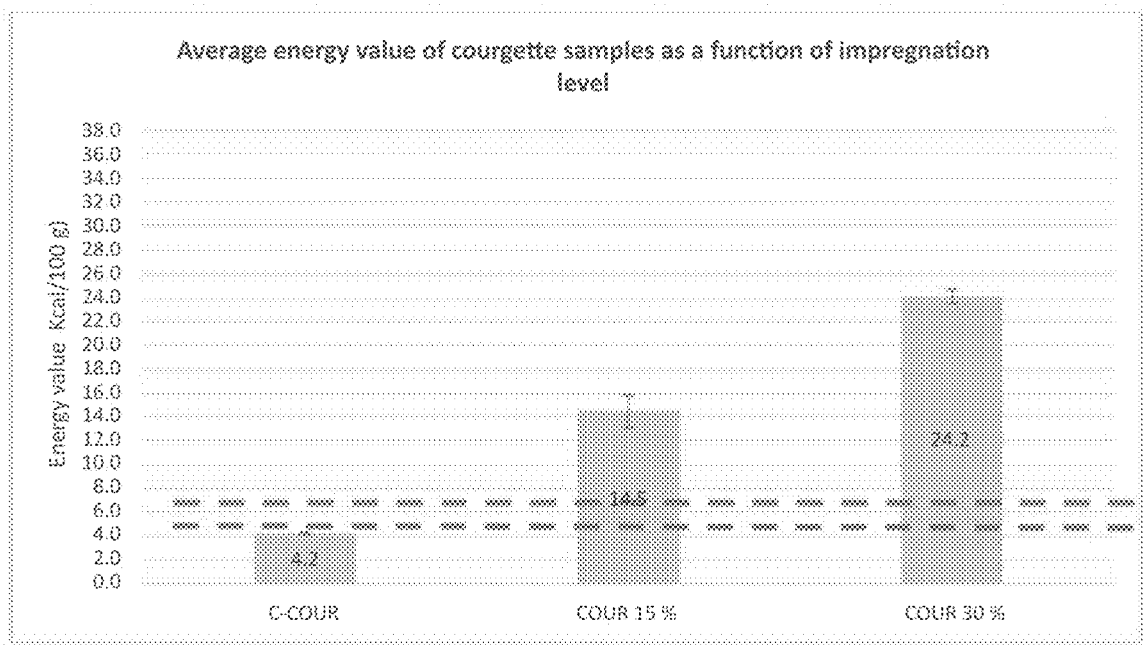

FIG. 3*g*: Pieces of raw courgette, impregnated with:

untreated: control (on the left)

a protein solution diluted to 15% (middle) and a protein solution diluted to 30% (on the right).

Figure 4:
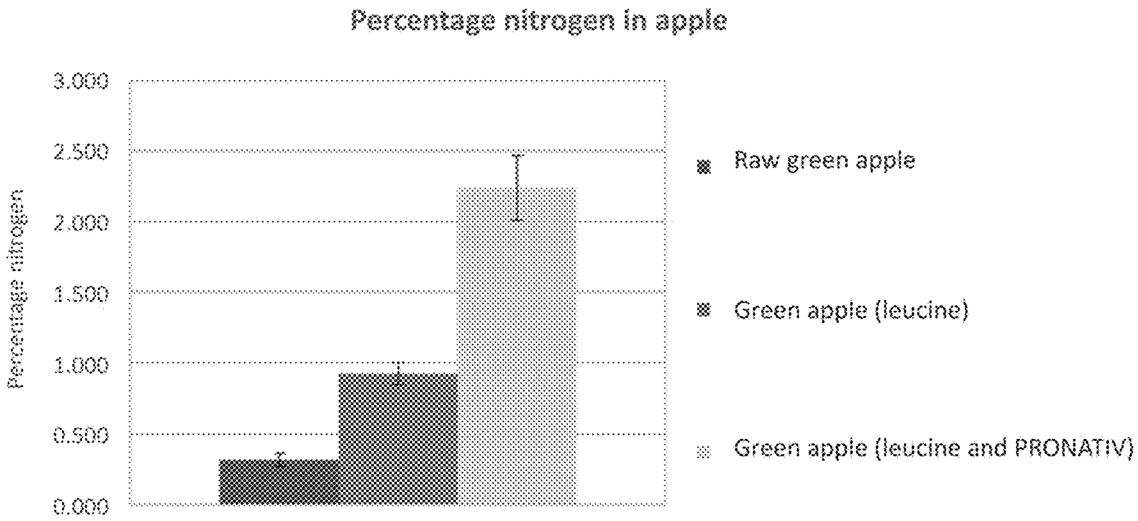

FIG. 4: Quantity of total nitrogen measured by the DUMAS method on pieces of apple impregnated under vacuum with (from left to right):

a solution without leucine, a solution with leucine, a solution with leucine+PRONATIV® 95 INSTANT.

DETAILED DESCRIPTION OF THE INVENTION

The present invention relates to a method for enriching a food with isolated amino acid(s) and/or with peptide(s) and/or with protein(s) and/or with dietary supplement(s) comprising the following steps:

- Obtaining a food matrix permeable to liquids;
- Placing said matrix in contact with an impregnation solution composed of a liquid, comprising at least one isolated amino acid and/or peptide and/or protein and/or dietary supplement, to which has optionally been added at least one plant and/or spice and/or aroma, in any form known to those skilled in the art (vegetable water, exudates, essential oil, infusion, maceration, powder, any part of the vegetative apparatus, special pharmaceutical form, copies of organic and non-organic synthesis, etc.);
- Impregnating said matrix with said isolated amino acid(s) and/or peptide(s) and/or protein(s) and/or dietary supplement(s), by applying an under-pressure comprised between 5 and 20 millibars to the matrix in its impregnation solution.

The terms employed in the present application are defined below for greater clarity in the description of the invention.

An "enrichment method" designates any method of which the aim is to obtain a higher concentration of the desired product in a product or a composition. Since it involves a method for enrichment with proteins, this designates a method making it possible to obtain a higher concentration of proteins than that normally observed in the considered product or composition.

Thus, an "enriched" food designates a food having a concentration or a quantity of isolated amino acid(s) and/or peptide(s) and/or protein(s) and/or dietary supplement(s) greater than that normally observed for this food, and in particular greater than the concentration or quantity of said isolated amino acid(s) and/or peptide(s) and/or protein(s) and/or dietary supplement(s) observed in the original food, before its treatment by the method according to the invention.

Such an enrichment corresponds to an increase in the quantity by dry weight of said isolated amino acid(s) and/or peptide(s) and/or protein(s) and/or dietary supplement(s) of at least 10% by dry weight compared to its quantity in the original food, advantageously at least 20%, 30%, 40%, 50%, 60%, 70%, 80%, 90% or 100% by dry weight compared to its quantity in the original food.

Such an enrichment may also correspond to an addition de novo of at least one isolated amino acid(s) and/or peptide(s) and/or protein(s) and/or dietary supplement(s) to a food not comprising it originally.

Such an enrichment method may be a method making it possible to produce said product in such a way that it contains more proteins: for example, the patent FR3003873 describes a method for enriching microalgae with proteins, consisting in modulating the culture conditions of said microalgae so that they attain a protein content greater than that generally observed.

Such a method also includes methods making it possible to integrate proteins in a finished product, as is the case for the method of the present invention.

"Food" is taken to mean in the sense of the invention any solid product (non-liquid), untreated or transformed, intended to be ingested by human beings to ensure their subsistence.

Foods are made up of nutrients, but must not be reduced to a simple sum of different nutrients. Indeed, interactions of said nutrients with each other create a specific and particular structure of each food, which is designated by the expression "food matrix".

In the present application, the terms "food" and "food matrix" are used interchangeably, and both designate the untreated product that will be subjected to the method of the invention. After carrying out the three essential steps of this method, the food obtained is called "enriched food" with amino acids and/or with peptides and/or with proteins and/or with dietary supplements.

In the sense of the invention, the expression "food matrix permeable to liquids" designates the physical structure of a food, which has sufficient porosity to absorb a certain quantity of liquid, when this food matrix is subjected to the method according to the invention.

The term "amino acid" designates the constituents of peptides and proteins, but also amino acids that are not directly proteinogenic, such as citrulline. These "base units" are constituted of a carboxylic acid having an amine functional group. All proteins are constituted of just 20 different amino acids. Certain amino acids may be synthesised by the metabolism of the body, others must imperatively be provided by the diet.

The term "peptide" designates a sequence of amino acids bound together by peptide bonds. This term designates in particular peptides constituted of a low number of amino acids (from two to several tens) which are also called oligopeptides. Polymers comprising a greater number of amino acids are called polypeptides.

The term "protein" designates assemblies of one or several polypeptides having undergone post-translational modifications, such as for example the bonds of chains of sugars, and/or folding into a three-dimensional conformation.

In the nutrition field, proteins are the main components of the structures of the cells of the body, they are considered as being the "building blocks" of the organism. They constitute the vast majority of the muscles, the bones, the hair, the nails, the skin, as well as all the organs. Hormones, enzymes and antibodies are also proteins.

Proteins are supplied by the diet: animal proteins, derived from meat, milk, eggs, fish; and plant proteins, derived from cereals, leguminous plants, vegetables and fruits are distinguished.

The ingested proteins are digested by the organism, that is to say that the chains of amino acids are "cut up" into free amino acids, which thus become absorbable. Three successive steps may be distinguished in the digestion of proteins:

- At the level of the stomach, the acidity of the medium begins to denature the proteins, they lose their complex structures. Pepsin breaks the peptide bonds between certain amino acids of the chain,
- At the level of the duodenum, endopeptidases (trypsin, chymotrypsin, elastase) of the pancreas as well as carboxypeptidases and aminopeptidases continue the digestion work: 30% of the amino acids are in free form, 70% are still in di- and tripeptide form, At the level of the cells of the inner wall of the small intestine (enterocytes), peptidases reduce a large part of the latter peptides into absorbable amino acids.

The absorption takes place at the level of the small intestine, the amino acids next being found in the blood circulation.

These amino acids are going to serve for the synthesis and the renewal of proteins: 300 to 400 grammes of proteins of the organism are renewed every day, which represents 3 to 4% of the total stock. They also participate in the production of energy according to the neoglycogenesis pathway.

The ANSES has established that a recommended nutritional intake of proteins is comprised between 1 g and 1.2 g of proteins ingested per kilogramme of mass of the organism fed and per day. This intake should however be increased to 1.7 g/kg/d in undernourished persons (see references 1, 2, 3 and 4).

The term "dietary supplement" is used in the present application without making reference to any regulatory restriction. It designates, in the sense of the invention, any compound capable of providing benefits to a living organism, which is consumed besides the diet. The aim of its administration is to provide a supplement of nutrients or substances having a nutritional or physiological effect (vitamins, minerals, fatty acids, sugars, trace elements, polyphenols), missing or in insufficient quantity in the normal diet of an individual. The term "dietary supplement" also designates detoxifying active ingredients, derived from land or marine plants, or coming under the family of natural or synthetic zeolites. This term also includes adjuvants, nutrients and culinary aids, notably those having anti-inflammatory and anti-proteolytic properties.

In the sense of the invention, the term "dietary supplement" is synonymous with "compound having a nutritional value", such a nutrient or substance having a positive physiological effect for the health of organisms ingesting said dietary supplement.

In the sense of the invention, the expression "culinary aid" designates food products intended to be used for the preparation of dishes, and not to be consumed as such. They are notably ready to use stocks (in the form of freeze-dried cubes or liquids), colorants, aromas, ready to use lemon juices, etc.

It is specified that the dietary supplement may be natural or synthetic.

The present invention more particularly relates to a method for enriching with isolated amino acid(s) and/or with peptide(s) and/or with protein(s) and/or with dietary supplement(s), comprising the following steps:

Obtaining a food matrix permeable to liquids;

Placing said matrix in contact with an impregnation solution composed of a liquid, comprising at least one isolated amino acid and/or peptide and/or protein, to which has optionally been added at least one plant and/or spice and/or aroma;

Impregnating said matrix with said isolated amino acid(s) and/or peptide(s) and/or protein(s) and/or dietary supplement(s), while applying an under-pressure comprised between 5 and 20 millibars to the matrix in its impregnation solution.

The present invention also relates to a method for enriching a food with a dietary supplement, such as natural or synthetic zeolite, with detoxifying properties, comprising the following steps:

Obtaining a food matrix permeable to liquids;

Placing said matrix in contact with an impregnation solution composed of a liquid, comprising at least one dietary supplement, to which has optionally been added at least one plant and/or spice and/or aroma;

Impregnating said matrix with said dietary supplement, by applying an under-pressure comprised between 5 and 20 millibars to the matrix in its impregnation solution.

According to a preferred embodiment, the method according to the invention is implemented with the aim of preparing a food having an enhanced nutritional value compared to its original nutritional value.

"Nutritional value" is taken to mean in the sense of the invention the quantity and the respective proportions of nutrients (carbohydrates, lipids, proteins, vitamins and minerals) present in a food product. It generally includes the energy intake of the food.

In the sense of the invention, "enhanced nutritional value" is taken to mean the nutritional value of a food that contains more of a certain nutrient, and/or an enhanced energy intake, compared to its original nutritional value, that is to say before the implementation of the method of the invention.

According to another preferred embodiment, the method according to the invention is implemented with the aim of preparing a food enriched with nutrients having a beneficial activity for the health of organisms.

Said nutrients having a beneficial activity for the health of organisms are well known to those skilled in the art, and numerous examples are described in the present application. They are notably vitamins, trace elements, fatty acids, complex carbohydrates and derivatives thereof, and plant extracts.

According to another embodiment, the method according to the invention makes it possible to prepare a food having both enhanced nutritional value compared to its original nutritional value, and enriched with nutrients having beneficial activity for the health of organisms.

Food Capable of being Enriched According to the Method

Preferably, the foods chosen to be enriched are constituted of a porous and/or spongy tissue, that is to say a tissue permeable to liquids, capable of absorbing an impregnation solution composed notably of a liquid with variable viscosity, amphiphilic, hydrophilic or lipophilic.

Any solid food, having a matrix permeable to liquids, may be concerned by the method according to the invention: it will however be preferably a food having a low initial level of proteins, plant or animal, and for which enrichment will thus have a positive impact on its general composition.

Preferably, the enriched food will be of plant origin. Preferably, it could be a fruit or a vegetable or a marine plant.

The term "fruit" designates, within the scope of the present invention, a sweet tasting plant food.

In particular, it could be a fruit selected from the following fruits: Apricot, Cranberry, Almond, Pineapple, Avocado, Banana, Black current, Cherry, Sweet Chestnut, Lemon, Clementine, Quince, Date, Fig, Strawberry, Raspberry, Passion fruit, Grenade, Red current, Kaki, Kiwi, Kumquat, Lychee, Mandarin, Mango, Chestnut, Melon, Mirabelle, Blackberry, Blueberry, Nectarine, Hazelnut, Walnut, Orange, Grapefruit, Pawpaw, Watermelon, Peach, Pear, Apple, Prune, Damson, Grape, Greengage, and Tomato.

The term "vegetable" designates the plant or a comestible part of a vegetable species. This part may be a root, a tubercule, a bulb, a young shoot, a stem, a set of leaves, a flower, a fruit in the botanical sense (i.e. containing seeds), or a seed. A strict definition of "vegetables" is not however obvious. The frontiers with certain aromatic or condiment plants, notably, are often debatable.

It could notably be a vegetable selected from the following vegetables: Garlic, Artichoke, Asparagus, Aubergine, Swiss chard, Beetroot, Broccoli, Carrot, Celery, Cabbage (red, white, Romanesco, etc.) Cauliflower, Kohlrabi, Pumpkin, Cucumber, Gherkin, Gourd, Courgette, Watercress, Chicory, Spinach, Fennel, Bean, Lettuce, Lamb's lettuce, Maize, Turnip, Onion, Parsnip, Custard Marrow, Pea, Leek, Snow pea, Pepper, Potato, Pumpkin, Squash, Radish, Salsify and Jerusalem artichoke.

The term "marine plant" designates the plant or a comestible part of a marine species. The marine plant may notably be a seaweed or sea grape.

The method according to the invention comprises three main steps. It is however understood that in the sense of the invention, said method may comprise other optional steps.

Notably, the food subjected to this enrichment method will be able to have undergone one or more prior treatment step(s) before being incubated in the impregnation solution.

According to an embodiment of the invention, the food subjected to the enrichment method is raw.

According to another embodiment of the invention, the food subjected to the enrichment method is cooked beforehand, that is to say that it has been subjected to a cooking step, thermal or chemical (incubation in lemon juice for example) for a sufficiently long period so that the molecular constituents of the food are modified.

According to a particular embodiment, the food subjected to the enrichment method is peeled and cut into bits. It could also be rinsed with water, and/or washed in a water bath to which vinegar has been added.

According to a particular embodiment, the food matrix subjected to the enrichment method has been scalded beforehand, in other words has been blanched, in order to soften its surface and/or its fibres. This treatment also makes it possible to sanitise the food and to limit oxidation. This step consists in an immersion of the food in boiling water for a period less than or equal to 1 minute. This step is not considered as being a cooking step, since its duration is less than the time necessary to obtain in-depth physical-chemical modification of the fibres of the food, whatever it is.

Impregnation Solution

The impregnation solution according to the invention comprises a liquid with variable viscosity, which may be amphiphilic, hydrophilic or lipophilic, charged or not charged, organically or electrically.

The impregnation solution according to the invention also comprises at least one isolated amino acid(s) and/or peptide(s) and/or protein(s) and/or dietary supplement(s).

According to an embodiment of the method according to the invention, said liquid is selected from: a water, an oil, a syrup, a milk, a fruit juice, a vegetable juice, or any mixture of these liquids.

According to an embodiment of the method, the impregnation solution is supplemented with at least one additional plant and/or at least one spice and/or at least one aroma, enabling an aromatisation of the foods subjected to the method. These plants and/or spices and/or aromas are distinct from the previously cited dietary supplements, since the aim of their presence is to give taste to the treated foods, and not to enrich them.

These plants, spices and aromas could be present in the impregnation solution in any form known to those skilled in the art, for example: vegetable water, exudates, essential oil, infusion, maceration, powder, any part of the vegetative apparatus, special pharmaceutical form, copies of organic and non-organic synthesis.

It is understood that the nature and the volume of the impregnation solution will be adapted to the nature and to the volume of the food, these adjustments being able to be easily carried out by those skilled in the art.

According to a preferred embodiment, the impregnation solution comprises at least:

- an isolated amino acid and/or peptide and/or protein, and
- at least one dietary supplement.

The combination of these two compounds: amino acid or peptide or protein on the one hand and, on the other hand, a dietary supplement, is particularly advantageous. Indeed, certain dietary supplements such as vitamins favour the absorption of proteins and/or peptides and/or amino acids. This potentializing effect of the dietary supplement is quite particularly sought after for the implementation of the method of the invention.

Isolated Amino Acids, Peptides and Proteins

According to an embodiment of the invention, the amino acid or the amino acids present in the impregnation solution is preferentially selected from amino acids essential for humans, which are the following: tryptophane, lysine, methionine, phenylalanine, threonine, valine, leucine, isoleucine and histidine. An additional amino acid is moreover essential for children: arginine.

So-called "essential" amino acids are not synthesised de novo by the organism, or synthesised at an insufficient rate, they thus necessarily have to be provided by the diet.

According to a particular embodiment of the invention, the impregnation solution comprises at least one of the following amino acids: leucine, isoleucine, valine, glutamine, arginine and citrulline.

Among important amino acids may be cited notably leucine: indeed, this amino acid stimulates muscular protein synthesis in humans.

Leucine also plays an important role in the control of glycaemia.

Leucine, richly contained in the whey drained off from cheeses or obtained by ultrafiltration of milk serves to supplement today the diet of seniors, who metabolise them better than other milk proteins such as casein.

Supplementation with glutamine, with citrulline, and/or with arginine is important in burn victims and for the treatment of bedsores, or to favour protein anabolism.

Preferably, the amino acids are added to the impregnation solution in the form of a mixture of several amino acids, proteinogenic or not, comprising for example 2, 3, 4, 5, 6, 7, 8, 9, 10, 11, 12, 13, 14, 15, 16, 17, 18, 19 or 20 different amino acids.

According to an embodiment of the invention, the peptide or the peptides and/or the protein or the proteins are derived from or constituted of plant proteins, animal proteins, or a mixture of both.

To decrease the risks of renal perturbations linked to a too important ingestion of proteins, rapid digestion proteins are favoured; which, in addition, leads to a strong increase in the intake of amino acids at the level of the muscle.

The peptides used could notably be derived from a hydrolysate of plant proteins, or animal proteins, or a mixture of both.

"Hydrolysate" is taken to mean a mixture of proteins having been subjected to the digestive action of one or several enzymes, to obtain a more digestible mixture of peptides. The proteins used could notably be constituted of a native protein isolate derived from the filtration of a liquid preparation comprising proteins.

"Isolate" is taken to mean a mixture of proteins having been treated to concentrate said proteins and to eliminate other molecules such as sugars or other molecular complexes, for example by filtration or centrifugation.

According to a particular embodiment of the invention, the impregnation solution comprises a protein hydrolysate. More particularly, the impregnation solution could consist in a protein hydrolysate.

According to another particular embodiment of the invention, the impregnation solution comprises a protein isolate. More particularly, the impregnation solution could consist in a protein isolate.

According to a particular embodiment, the mixture of peptides and/or proteins will comprise an emulsifier compound, such as soya lecithin, which by producing a film of phospholipids around the proteins aims to make them more soluble.

According to an embodiment of the invention, the amino acid or the amino acids and/or the peptide or the peptides and/or the protein or the proteins are derived from milk or from whey.

Not all native dietary proteins, for example the proteins of whey and casein, are digested at the same rate. The proteins of whey are digested easily and have total bioavailability. Following their ingestion, dietary amino acids of whey appear rapidly and in high concentration in the plasma, whereas this concentration remains moderate in the case of casein. Studies carried out on healthy elderly volunteers have made it possible to show that the proteins of whey stimulate protein synthesis after the meal, while casein remains virtually inefficient. These differences can modify the protein metabolism response, in particular in the elderly. "Rapid digestion" proteins are not all efficient and their compositions of amino acids differ. It would thus seem that the stimulating effect of this type of protein on protein synthesis in the elderly is not due to the overall rate of digestion, but rather to the kinetics of appearance of amino acids. Indeed, the profile of the amino acids of whey and casein are different. They both contain the amino acids necessary for the stimulation of the synthesis of muscular proteins. However, whey has a higher leucine content.

It is also demonstrated that the ingestion of the proteins of whey further stimulates the rate of synthesis of myofibrillary proteins than the ingestion of micellar casein in similar quantity in health elderly men, and this is so not just at rest but also after resistance exercises.

Thus, according to a particular embodiment of the invention, the impregnation solution comprises whey. More particularly, the impregnation solution could consist in whey.

Preferably, the impregnation solution will comprise (or will consist in) a native serum protein isolate, obtained by membrane filtration of cow's milk. This serum protein isolate could advantageously be with a low lactose content (less than 1%, or even less than 0.3%).

In the examples of the present application, two types of protein isolates were tested:

The product PRONATIV® 95 CLINICAL (also known by the trade name PROLACTA), produced by the Lactalis Group, has the particularity of being rich in leucine. This native serum protein isolate is derived from milk, and not whey, and is obtained by membrane filtration, without heating and thus without protein denaturation. Advantageously, this product does not contain residual casein-macropeptides of lower nutritional quality. Its protein content, on dry weight, is at least 95 g for 100 g of dry product. A version of this product exists with a low lactose content (0.2 g for 100 g).

The product PRONATIV® 95 INSTANT, also produced by Lactalis, was also studied: its nutritional composition is identical to that of the first product, but to which has been added an emulsifier: soya lecithin, which is going to produce a film of phospholipids around the proteins aiming to make the proteins more soluble.

Dietary Supplements, Nutrients and Culinary Aids

One of the advantages of the present invention is that a dietary supplement, such as a nutrient or a culinary aid normally consumed in addition to the diet, may be integrated in a food. Thus, by consuming said food, the consumer profits from the benefits of the food and the dietary supplement, all together in a single ingestion.

It has been proposed by numerous health professionals to complement certain therapies, notably anti-cancer treatments, with dietary supplements, such as herbs, vitamins, trace elements, fatty acids, complex carbohydrates and derivatives thereof, and plant extracts. Indeed, it is important to compensate the loss of appetite, metabolic abnormalities, or even proteolytic inflammation, which appear in persons treated by chemotherapy or immunotherapy (anti-cancer or not) and/or radiotherapy, or any type of surgery.

Furthermore, certain therapists also propose a nutritional supplementation with dietary supplements, nutrients and culinary aids, such as aromatic herbs, vitamins, trace elements, essential fatty acids, complex carbohydrates and derivatives thereof, plant extracts, making it possible to detoxify the organism subjected to treatments having or having had toxic effects.

Among the dietary supplements (including nutrients and culinary aids) the most used as anti-proteolytic and/or anti-oxidant and/or proteinogenic and/or detoxifying immunostimulants, may be cited: garlic (native or fermented), aloe vera, milk thistle, turmeric, lavender, coriander, cinnamon, fenugreek, argan, cumin, fennel, aniseed, cumin, wintergreen, basilic, white willow, black current, Scot's pine, camomile, sage, green tea, tea tree, birch water, marigold, thyme, savoury, oregano, marjoram, rosemary, noni, watermelon, *echinacea, desmodium*, artichoke, devil's claw (Harpagophytum), achiote, floral waters, tansy, hops, clove, valerian, Rehmannia *glutinosa*, liquorice, propolis, honey, *Echinacea*, grape seed extract, extract of grapefruit, ginger, ginkgo, *ginseng*, muscade, mistletoe, St John's wort (Millepertuis), omega 3 or fish fatty acids EPA/DHA, soya extract, green tea, or instead zeolites. Their richness, indifferently, in vitamins D, B6, B12, E, in trace elements such as zinc, selenium or instead iron and copper, in beta-glucans, in prebiotics, in coenzyme Q10, in quercetin, in resveratrol, in isoflavones or instead with phyto-oestrogens, explains their direct or indirect activity for generating the benefits described above.

According to an embodiment of the invention, these active ingredients may be used alone or in combination, in solution in the impregnation liquid with variable viscosity, amphiphilic, hydrophilic or lipophilic.

According to an embodiment of the method according to the invention, the dietary supplement present in the impregnation solution is selected from turmeric and zeolite.

The term "zeolite" designates a crystal formed of a microporous skeleton of aluminosilicate, of which the connected empty spaces are initially occupied by cations and water molecules.

Within this structure, the cations and water molecules are mobile, which enables ion exchanges, and the possibility of replacing the water by another absorbed phase. Zeolites are considered as molecular sieves because, according to their porosity, certain molecules will be able to traverse them whereas others will be retained due to their size.

These properties confer on them an interest in medicine, notably through their capacity to trap toxins and heavy metals. They may be used as detoxifiers for persons having followed chemotherapy and radiotherapy treatments (see reference 5).

More precisely, it has been proposed to use zeolites to "trap" heavy metals such as lead, cadmium, arsenic, mercury and thus "detoxify the organism" following treatments involving said metals, or radioactive radiations.

The zeolites used may be natural or synthetic.

They may themselves serve as transporters of medicinal or nutritional active ingredients.

"Clinoptilolite" zeolite is the best known and most widely used form. Professionals of the dietary supplements market recommend a daily dosage of 5 g of zeolite, without exceeding 15 g maximum, with several ingestions of 5 g each.

According to an embodiment of the invention, the dietary supplement present in the impregnation solution is zeolite.

Impregnation Under Partial Vacuum

In the method according to the invention, the impregnation of the food matrix with isolated amino acid(s) and/or peptide(s) and/or protein(s) and/or dietary supplement(s) is carried out by applying an under-pressure, comprised between 5 and 20 millibars, to the matrix in its impregnation solution.

This under-pressure is preferably comprised between 5 and 15 millibars, and preferably is equal to around 10 millibars.

This depression may be obtained by any existing apparatus, comprising a vacuum pump enabling extraction of the air present in a leak tight enclosure.

This depression may be obtained either with a "kitchen table" vacuum packing machine for private individuals, such as the "HOME" machine or the C200 machine sold by MULTIVAC®, or with an industrial machine.

Machines intended for private individuals have powers of the order of 60 $m^3$/hour. Machines intended for professionals have powers of the order of 150 to 300 $m^3$/hour, and up to 600 $m^3$/hour for industrial uses.

In catering, the apparatus the most widely used is the vacuum packing machine.

According to a particular aspect of the invention, the step of vacuum impregnation is carried out using a vacuum packing machine.

This vacuum packing machine is notably sold by companies such as LAVEZZINI®, HENKELMANN®, MAGIC VAC® or MULTIVAC®.

As a function of the capacity of the apparatus used, the depressurisation step could last a more or less long time, notably if it is not equipped with a vacuum packing system.

According to a conventional embodiment, the vacuum will be broken immediately after depressurisation, without intermediate phase of maintaining under vacuum.

According to a particular embodiment, the partial vacuum impregnation step lasts between 10 and 60 seconds, and is followed by a rise in pressure up to atmospheric pressure. Preferably, after the partial vacuum impregnation step, the food is wiped and/or drained and/or dried to remove the excess of impregnation liquid.

Enriched Food Such as Obtained by the Method According to the Invention

The present invention also relates to a food enriched with isolated amino acid(s) and/or peptide(s) and/or protein(s) and/or dietary supplement(s), susceptible to be obtained by the method such as described above.

A subject matter of the invention is also a food enriched with isolated amino acid(s) and/or peptide(s) and/or protein(s) and/or dietary supplement(s), obtained by the method according to the invention.

This enriched food has an enhanced nutritional value compared to its original nutritional value, before its enrichment by the method of the invention. This makes it a so-called "health food" because its consumption is intended to promote the health of human beings consuming it, or even to treat certain affections.

The present invention also relates to said food enriched with isolated amino acid(s) and/or peptide(s) and/or protein(s), and/or dietary supplement(s), for the use thereof in the treatment of undernutrition of persons affected by this syndrome, whatever the aetiology (natural or iatrogenic).

Another aspect of the invention relates to a method for treating undernutrition (natural or iatrogenic), comprising the administration to an individual affected by this syndrome of a food enriched with isolated amino acid(s) and/or with peptide(s) and/or with protein(s) and/or with dietary supplement(s), susceptible to be obtained or obtained by the method according to the invention.

The present invention also relates to said food enriched with isolated amino acid(s) and/or with peptide(s) and/or with protein(s) and/or with dietary supplement(s), notably with zeolites, for the use thereof combined with chemotherapy, immunotherapy, hormonotherapy or radiotherapy treatments, in the treatment of cancer.

In particular, such a food enriched with zeolites will be used in the detoxification of persons to which chemotherapy products of all types have been administered.

The present invention also relates to a combination product comprising a food enriched with isolated amino acid(s) and/or with peptide(s) and/or with protein(s) and/or with dietary supplement(s) obtained by the method according to the invention, and at least one therapeutic compound selected from a chemotherapy, immunotherapy, or hormonotherapy compound, for a simultaneous, separate or sequential use in the treatment of cancer.

Another aspect of the invention relates to a method for treating or adjuvant for treating pathologies, comprising the simultaneous, separated or sequential administration, to a sick individual affected by cancer:

of a food enriched with isolated amino acid(s) and/or with peptide(s) and/or with protein(s) and/or with dietary supplement(s), notably with zeolites, capable of being obtained or obtained by the method according to the invention, and of a chemotherapy, immunotherapy, hormonotherapy or radiotherapy treatment.

The present invention also relates to a food enriched with isolated amino acid(s) and/or with peptide(s) and/or with protein(s) and/or with dietary supplement(s), for the use thereof in the treatment of various affections other than cancer.

In particular, the present invention also relates to a food enriched with isolated amino acid(s) and/or with peptide(s) and/or with protein(s) and/or with dietary supplement(s), for the use thereof in the treatment of the following affections: type 2 diabetes, disorders requiring a reconstruction of the skin, such as necroses of the skin observed in cases of bedsores or burns.

Finally, the food enriched with isolated amino acid(s) and/or peptide(s) and/or protein(s) and/or dietary supplement(s) capable of being obtained, or obtained according to the method described above, could be used for the diet of athletes, notably top level athletes; or instead astronauts, with the aim of limiting muscular loss due to the absence of gravity in space.

A food enriched with leucine obtained according to the method of the invention will be quite particularly suited for these populations.

Preparation Kit

The present invention also relates to a kit for preparing an impregnation solution comprising:

- at least one isolated amino acid and/or a peptide and/or a protein and/or a dietary supplement;
- at least one plant and/or a spice and/or an aroma;
- at least one zeolite;
- optionally, a liquid.

EXAMPLES

Example 1. Nature of the Food Matrices Retained for the Study

Seven food matrices were retained for the study: fruits such as apple, pear, kiwi and clementine. Vegetables were also studied: courgette, cucumber and chicory. These products were selected because:

- they have a low initial protein content, which must make it possible to better visualise the differential between the control sample and the treated sample;
- they are constituted of a spongy tissue which should enable better exchanges with the external environment.

TABLE 1

| Name | Typology | Energy (kcal) | Proteins (g/100 g) | Carbo-hydrates (g/100 g) | Lipids (g/100 g) |
|---|---|---|---|---|---|
| Apple | Fruit | 53 | 0.25 | 11.6 | 0.25 |
| Pear | Fruit | 53 | 0.49 | 10.6 | 0.27 |
| Kiwi | Fruit | 58.5 | 1.2 | 8.44 | 0.95 |
| Clementine | Fruit | 48.5 | 0.8 | 11.9 | 0.19 |
| Cucumber | Vegetable | 13.2 | 0.64 | 1.87 | 0.11 |
| Chicory | Vegetable | 20.8 | 1.1 | 3.15 | 0.2 |
| Courgette | Vegetable | 16.5 | 1.22 | 1.8 | 0.26 |

Summary of the main nutritional values of the studied food matrices

Summary of the Main Nutritional Values of the Studied Food Matrices

All of the values are indicative and correspond to the raw products.

Example 2. Equipment and Methods for the Preparation of the Samples

1. For Protein Impregnation

The foods come from the same supplier and from the same production batch for a given test. Each whole fruit or vegetable, not having undergone any heat treatment beforehand, was firstly washed in a white vinegar bath for 5 min of soaking, then rinsed in a second bath for 5 min of soaking. Then they were cut up into thin slices, into quarters or parallelepiped rectangles. The mass of the food was noted.

For the tests with PRONATIV® 95 CLINICAL proteins, four solutions were prepared, two repetitions were made for each sample:

- Solution S1 with 15% of PRONATIV® 95 CLINICAL proteins and 85% of water
- Solution S2 with 30% of PRONATIV® 95 CLINICAL proteins and 70% of water
- Solution S3 with 15% of PRONATIV® 95 INSTANT proteins (with emulsifier) and 85% of water
- Solution S4 with 30% of PRONATIV® 95 INSTANT proteins (without emulsifier) and 70% of water Each sample was placed in a plastic tray and soaked to its height with the protein solution. Table 2 summarises all of the average masses for each product typology as well as the quantity of added protein solution. The tray is placed in the C200 MULTIVAC type vacuum packing machine.

The vacuum is taken to 10 millibars (mb), i.e. 10 hectoPascals (hPa), at an ambient temperature of 20+/−1° C., obtained in 35 seconds. The depressurisation differential is 1020 mb compared to the Beauvais reference atmospheric pressure of 1030 mb at this temperature. The breakage of the vacuum is instantaneous after these 35 s of depressurisation, without intermediate phase of maintaining under vacuum. This limit of 10 mb comes down to creating a 97% vacuum. This threshold of 10 mb makes it possible to avoid the occurrence of a saturation of the spongey network of the plant.

After treatment, each sample was passed under a trickle of clear water and drained on a grid for 10 minutes. The mass of the sample after vacuum impregnation was noted.

TABLE 2

| Food matrix | Calibration | Equipment used | Average mass of product (g) | Mass of added protein solution (g) |
|---|---|---|---|---|
| Apple | Slice 5 mm thick | Robot Coupe ® vegetable cutter | 14.5 | 20 |
| Pear | Slice 5 mm thick | Robot Coupe ® vegetable cutter | 14.7 | 20 |
| Kiwi | Slice 5 mm thick | Robot Coupe ® vegetable cutter | 9 | 20 |
| Clementine | Quarter with skin | / | 5.5 | 20 |
| Cucumber | Slice 3 mm thick | Mandoline | 18 | 20 |
| Chicory | Parallelepiped rectangle | Mandoline | 12.3 | 20 |
| Courgette | Slice 3 mm thick | Mandoline | 13.8 | 20 |

Detailed summary of the preparation of food matrices for protein impregnation

Detailed Summary of the Preparation of Food Matrices for Protein Impregnation

2. For the Assay of Total Nitrogen

A. Determination of the Dry Matter Content

The samples obtained following vacuum impregnation were dried in an oven at 105° C. for 24 hours in order to determine the dry matter content and to carry out thereafter the assay of the total nitrogen contained in the sample.

To do so, each sample was placed in an aluminium cup of which the mass was noted beforehand (mA). Then the total mass of the impregnated sample+aluminium cup was noted (mB). The samples were next placed in the oven preheated to 105° C. After drying, the samples were weighed (mass of the dried impregnated sample+aluminium cup=mC).

The percentage dry matter (% MS) corresponds to:

$$\% MS = \frac{mC - \mathrm{mA}}{mB - \mathrm{mA}} \times 100$$

With:

mA=mass aluminium cup mB=mass impregnated fresh sample+aluminium cup mC: mass dry sample+aluminium cup B. Assay of Total Nitrogen by the DUMAS Method The total nitrogen measurement was performed by means of the Dumas method. Each sample, dried beforehand in an oven, was reduced into the form of very fine powder using QIAGEN grinding jars and a QIAGEN TissueLyser II type grinding apparatus. This powder was then analysed on a LECO FP-528 nitrogen analyser.

One hundred milligrams were accurately weighed out on a tin sheet and analysed in duplicate.

The total percentage nitrogen corresponds to:

$$\% \, NT \text{ fresh product} = \frac{\% \, MS \times \% \, NT \text{ dry product}}{100}$$

With:

% NT fresh product=% total nitrogen in the impregnated product

% MS=% dry matter in the impregnated product

% NT dry product=% total nitrogen in the dry product

From the total percentage nitrogen present in the impregnated product obtained, it is possible to calculate the quantity of proteins then present within the samples according to the following equation:

$$\text{Proteins} = \% \text{ NT fresh product} \times 6.25$$

3. For Impregnation with Zeolite

The foods come from the same suppliers and from the same production batch for a given test. Only gherkins, derived from a bottled preserve, were treated by an acidic and salted brine.

Each whole fruit or vegetable, not having undergone any heat treatment beforehand, was firstly washed in a white vinegar bath for 5 min of soaking, then rinsed in a second bath for 5 min of soaking. Then they were cut up into thin slices, into quarters or into parallelepiped rectangles. The mass of the food was noted.

In a preliminary study on apples, several preparations of zeolite were prepared, using two different references:

Solutions S1=Zeolite Clinoptilolite of "greenish white" colour, of 50 microns particle size, Laboratoire Nature-Forme, Figueras, Spain.

Solutions S2=Zeolite Clinoptilolite of "off white" colour, of 1 to 5 microns particle size, ZEO-MEDIC, Laboratoire Zeo-medic, Serbia.

The conclusions of an organoleptic nature of the preliminary study prompted crunchy fruits and vegetables to be selected for the remainder of the tests.

Each sample was placed in a plastic tray and soaked with 100 ml of control or experimental solution.

Table 3 summarises all of the average masses for each product typology as well as the quantity of solution added. The tray is placed in the C200 MULTIVAC type vacuum packing machine. The vacuum is taken to 10 millibars (mb), i.e. 10 hectoPascals (hPa), at the ambient temperature of 20+/−1° C., obtained in 35 seconds. The depressurisation differential is 1020 mb compared to the Beauvais reference atmospheric pressure of 1030 mb at this temperature. The breaking of the vacuum is instantaneous after these 35 seconds of depressurisation, without intermediate phase of maintaining under vacuum.

After the preliminary tests, aiming to compare two zeolites, the main study was conducted on three repetitions for each sample. Next, each sample was passed under a trickle of clear water and drained on a grid for 10 minutes. The mass of the sample after was noted.

TABLE 3

| Food matrix | Calibration | Equipment used | Average mass of product (g) | Mass of added solution (g) |
|---|---|---|---|---|
| Golden delicious apple | Sticks 5 mm square and 5 cm long | Knife | 50 | 100 |
| Courgette | Sticks 5 mm square and 5 cm long | Knife | 50 | 100 |
| Red ball radish | Quarters | Knife | 50 | 100 |
| Horseradish | Sticks 5 mm square and 5 cm long | Knife | 50 | 100 |
| Cucumber | Sticks 5 mm square and 5 cm long | Knife | 50 | 100 |
| Gherkin | Sticks 5 mm square and 5 cm long | Knife | 50 | 100 |
| Courgette | Sticks 5 mm square and 5 cm long | Knife | 50 | 100 |

Detailed summary of the preparation of food matrices for Zeolite impregnation

Detailed Summary of the Preparation of Food Matrices for Zeolite Impregnation

The determination of the migration of zeolite into the food is carried out by monitoring the evolution of the dry matter thereof before and after treatment: without the vacuum, with clear water impregnation, with impregnation of water loaded with 5% suspended zeolite.

The dry matter analysis method is the same as that employed for the impregnation of proteins.

Figure 1A:
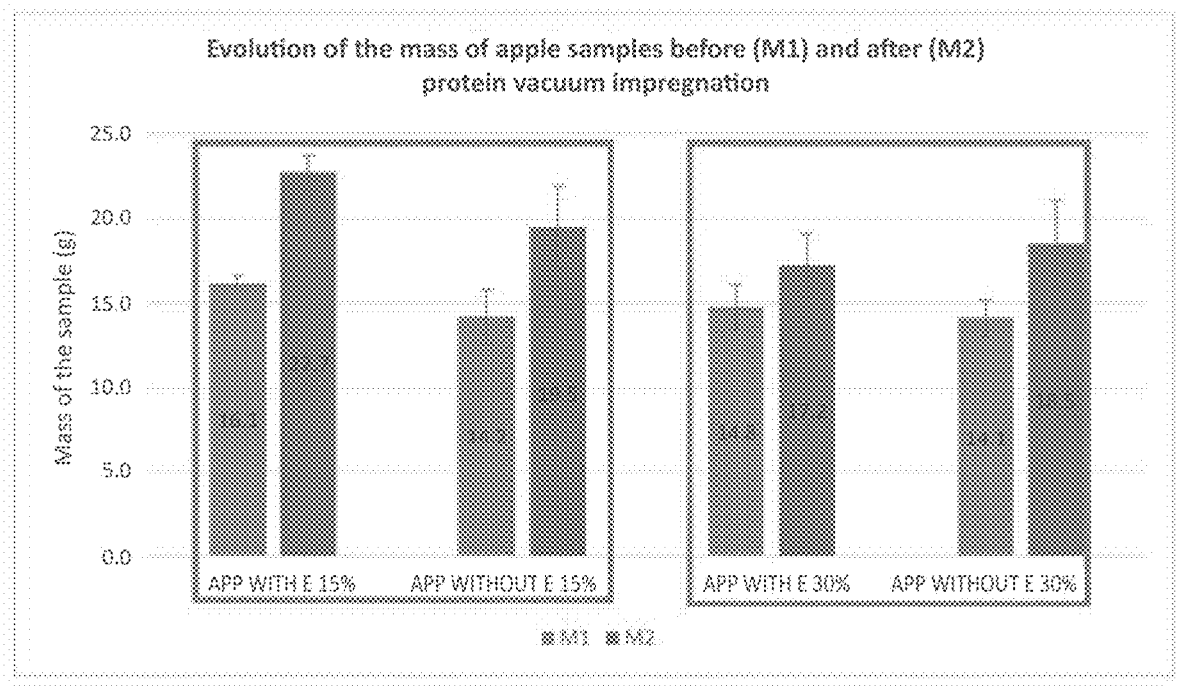
FIG. 1*a*: Pieces of raw apple, impregnated with:
- a protein solution diluted to 15% with emulsifier (with E) and without emulsifier (without E) (on the left) and
- a protein solution diluted to 30% with emulsifier (with E) and without emulsifier (without E) (on the right).

Example 3. Results of Protein Vacuum Impregnation on the Mass of Fruits and Vegetables Apple FIG. 1A shows the evolution of the mass of each apple sample noted before (mass 1: M1) and after (mass 2: M2) protein vacuum impregnation.

It is observed that the impregnation of slices of apple in a solution of native serum protein isolates, diluted to 15% and to 30%, leads to a significant increase in the mass 2, with the exception of the sample APP WITH E 30%.

These results thus assume that the solution has penetrated into the samples.

It is also remarked that the samples impregnated in a protein solution with emulsifier (PRONATIV® 95 INSTANT) diluted to 15% have a mass M2 significantly higher than the samples impregnated in a solution diluted to 30% (with and without emulsifier). This result may be explained by saturation of the fruit network.

Pear

Figure 1B:
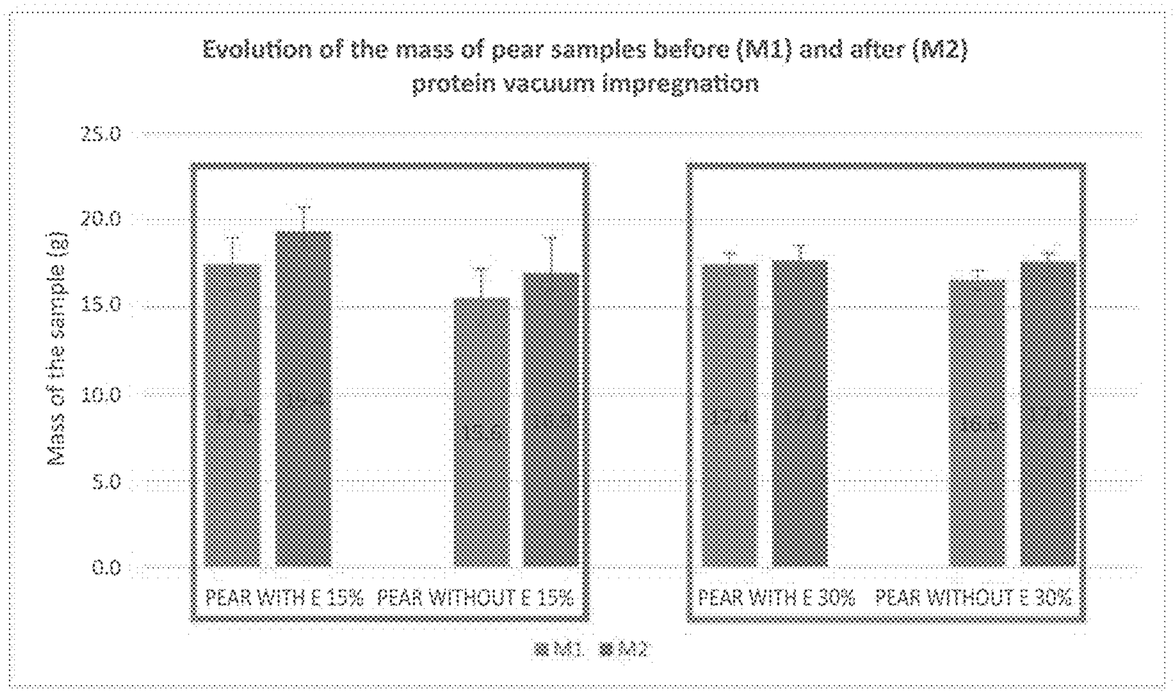
FIG. 1*b*: Pieces of raw pear, impregnated with:
- a protein solution diluted to 15% with emulsifier (with E) and without emulsifier (without E) (on the left) and
- a protein solution diluted to 30% with emulsifier (with E) and without emulsifier (without E) (on the right).

FIG. 1B shows the evolution of the mass of each pear sample noted before (mass 1: M1) and after (mass 2: M2) protein vacuum impregnation.

No significant difference is observed for the masses of the samples before impregnation (M1), which is explained by the calibration of the fruits at the start of the experiment.

It is observed that the impregnation of slices of pear in a solution of native serum protein isolates, diluted to 15% and to 30% with and without emulsifier, does not lead to a significant difference of the mass 2 compared to the mass 1.

Kiwi

Figure 1C:
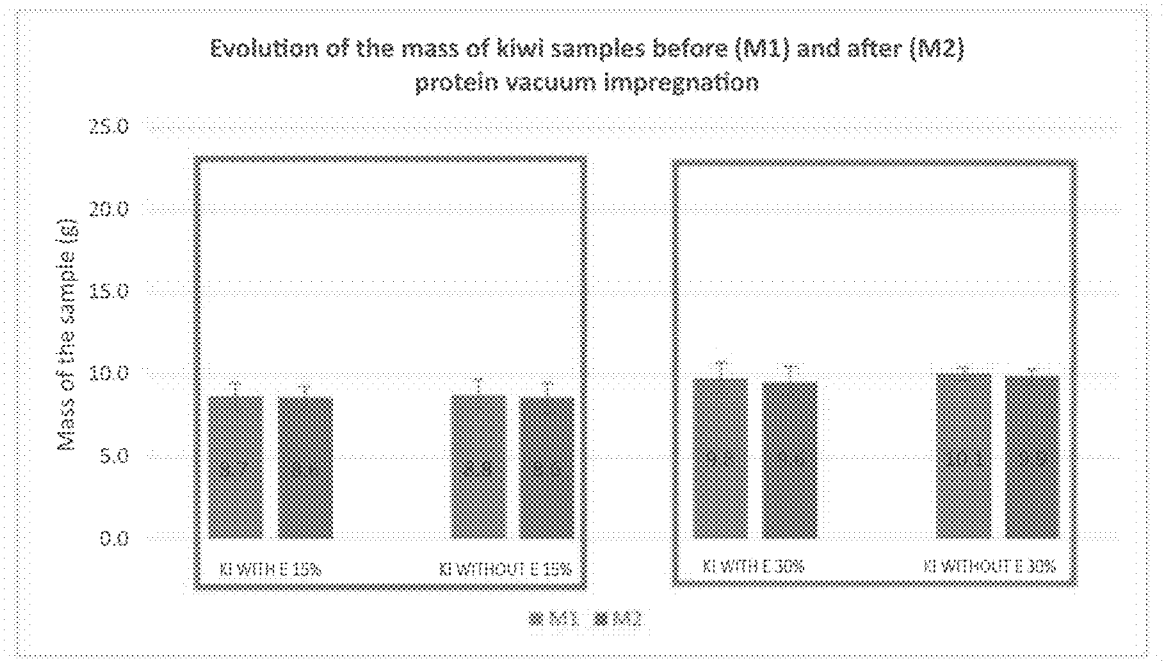
FIG. 1*c*: Pieces of raw kiwi, impregnated with:
- a protein solution diluted to 15% with emulsifier (with E) and without emulsifier (without E) (on the left) and
- a protein solution diluted to 30% with emulsifier (with E) and without emulsifier (without E) (on the right).

FIG. 1C shows the evolution of the mass of each kiwi sample noted before (mass 1: M1) and after (mass 2: M2) protein vacuum impregnation.

No significant difference is observed between the masses 1 and 2 noted following the impregnation of the kiwi samples in a solution of native serum protein isolates, diluted to 15% and to 30% with and without emulsifier.

Clementine

Figure 1D:
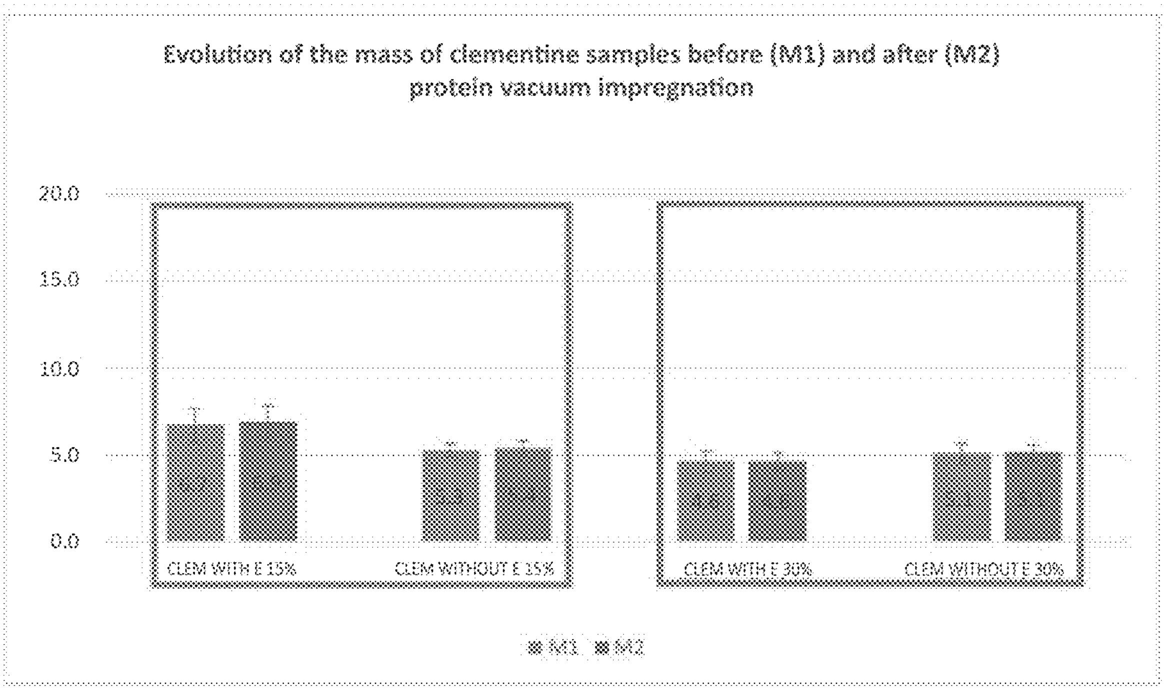
FIG. 1*d*: Pieces of raw clementine, impregnated with:
- a protein solution diluted to 15% with emulsifier (with E) and without emulsifier (without E) (on the left) and
- a protein solution diluted to 30% with emulsifier (with E) and without emulsifier (without E) (on the right).

FIG. 1D shows the evolution of the mass of each clementine sample noted before (mass 1: M1) and after (mass 2: M2) protein vacuum impregnation.

No significant difference is observed between the masses 1 and 2 noted before and after impregnation of the clementine samples in a solution of native serum protein isolates, diluted to 15% and to 30% with and without emulsifier.

Cucumber

For the tests with vegetables (cucumber, chicory and courgette), only serum protein isolates without emulsifier (PRONATIV® 95 CLINICAL) were tested.

In tasting tests by the operators themselves, we in fact detected a more or less pronounced bitter aftertaste in the presence of emulsifier. Finally, the miscibility of the protein solutions with and without emulsifier is very similar and the addition of soya lecithin does not seem justified for our use.

Figure 1E:
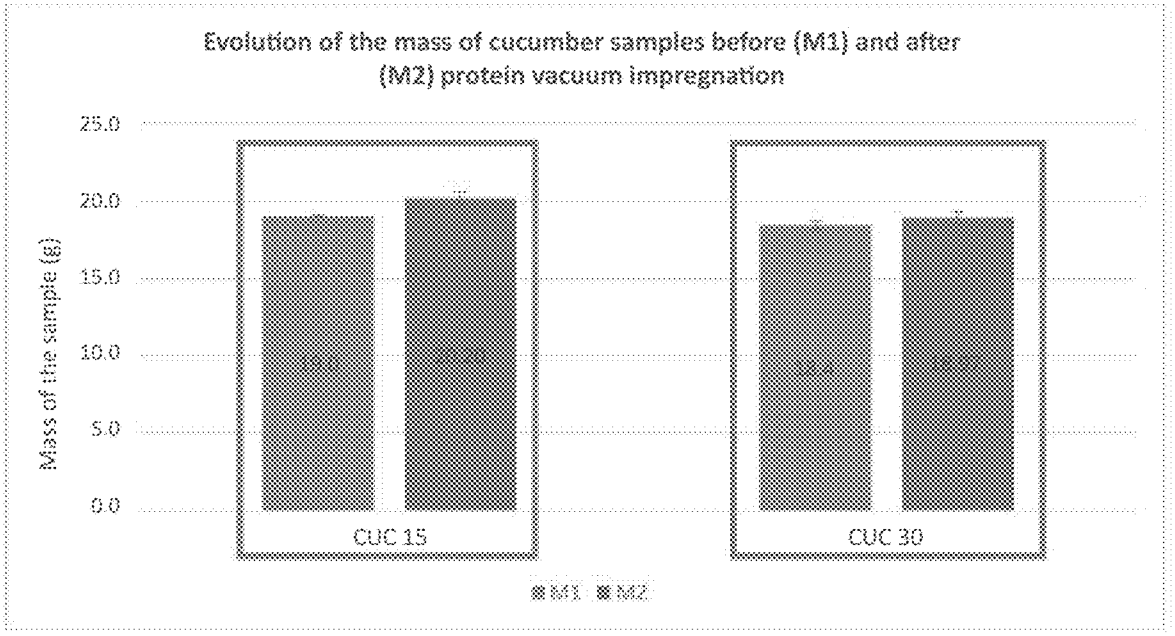
FIG. 1*e*: Pieces of raw cucumber, impregnated with:
- a protein solution diluted to 15% (on the left) and
- a protein solution diluted to 30% (on the right).

FIG. 1E shows the evolution of the mass of each cucumber sample noted before (mass 1: M1) and after (mass 2: M2) protein vacuum impregnation.

A significant difference is observed between the masses 1 and 2 for the cucumber samples impregnated in a protein solution diluted to 15% without emulsifier (CUC 15). The gain in mass remains however relatively low: 1.20 g additional on average.

On the other hand, no significant difference is observed for the samples impregnated in a protein solution diluted to 30% (CUC 30).

Chicory

Figure 1F:
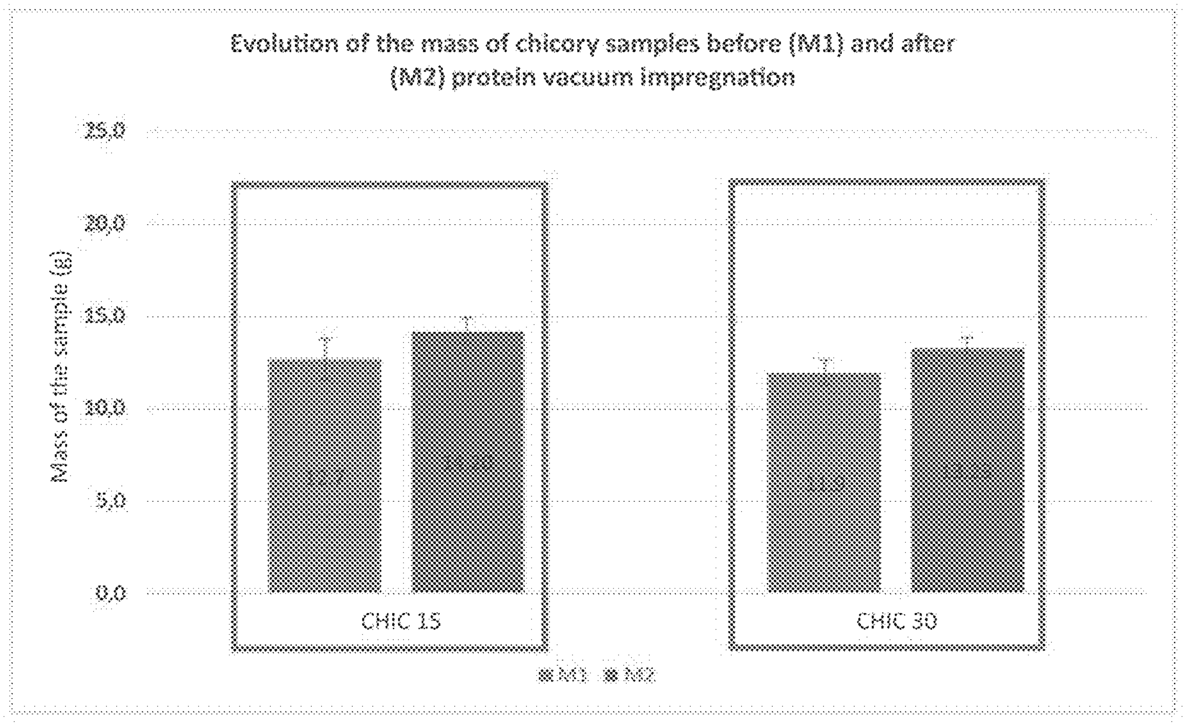
FIG. 1*f*: Pieces of raw chicory, impregnated with:
- a protein solution diluted to 15% (on the left) and
- a protein solution diluted to 30% (on the right).

FIG. 1F shows the of the masses of each chicory sample noted before (mass 1: M1) and after (mass 2: M2) protein vacuum impregnation.

No significant difference is observed for the samples impregnated in a protein solution (without emulsifier) diluted to 15% (CHIC 15).

A significant difference is observed between the masses 1 and 2 for the samples of chicory impregnated in a protein solution diluted to 30% without emulsifier (CHIC 30). The weight gain remains however relatively low: 1.33 g additional on average.

Courgette

Figure 1G:
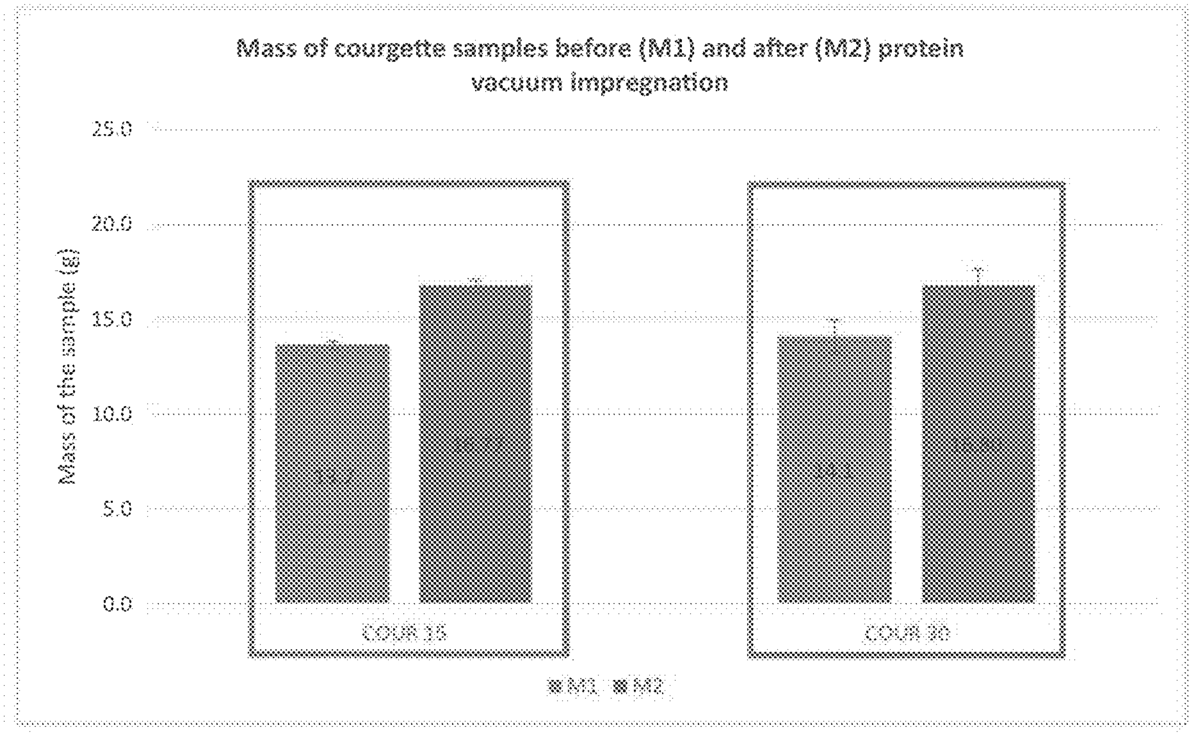
FIG. 1*g*: Pieces of raw courgette, impregnated with:
- a protein solution diluted to 15% (on the left) and
- a protein solution diluted to 30% (on the right).

FIG. 1G shows the evolution of the mass of each courgette sample noted before (mass 1: M1) and after (mass 2: M2) protein vacuum impregnation.

A significant difference is observed between the masses 1 and 2 for the courgette samples impregnated in a protein solution diluted to 15% and to 30% without emulsifier (COUR 15 and COUR 30). The mass gain is 3 g on average for COUR 15%, and 2.7 g for COUR 30%.

The impregnation of the courgette samples with a solution diluted to 15% seems to favour a slightly higher gain in mass.

Example 4. Results of the Measurement of Total Nitrogen by the DUMAS Method

Apple

Figure 2A:
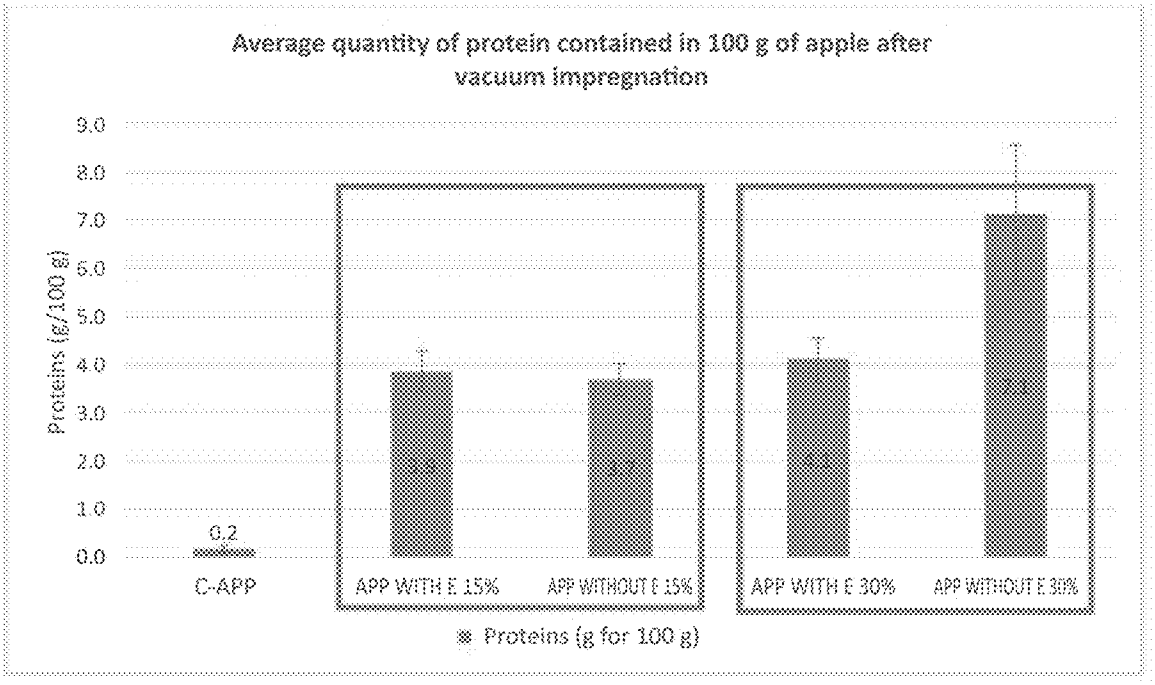
FIG. 2*a*: Pieces of raw apple, impregnated with:
- untreated: control (on the left)
- a protein solution diluted to 15% with emulsifier (with E) and without emulsifier (without E) (middle) and
- a protein solution diluted to 30% with emulsifier (with E) and without emulsifier (without E) (on the right).

FIG. 2A shows the average quantity of protein present in the different apple samples having been vacuum impregnated with a protein solution diluted to 15% and 30%, with and without emulsifier. They are compared with the control: apple not having been impregnated.

It may be seen that the apple samples after vacuum impregnation all contain more proteins than the control. That which contains the most thereof is APP WITHOUT E 30%, that is to say the samples of apple having been impregnated in a protein solution diluted to 30% without emulsifier. It may also be observed that the control apple sample is low in protein.

The vacuum impregnation of the apples with a protein solution causes an increase in the protein content.

The data were processed as a function of the energy value in order to visualise the possibility or not of making a nutritional claim: the results are shown in FIG. 3A.

The apple samples vacuum impregnated with a protein solution meet the conditions necessary to make the nutritional claims "source of proteins" and "rich in proteins".

Pear

Figure 2B:
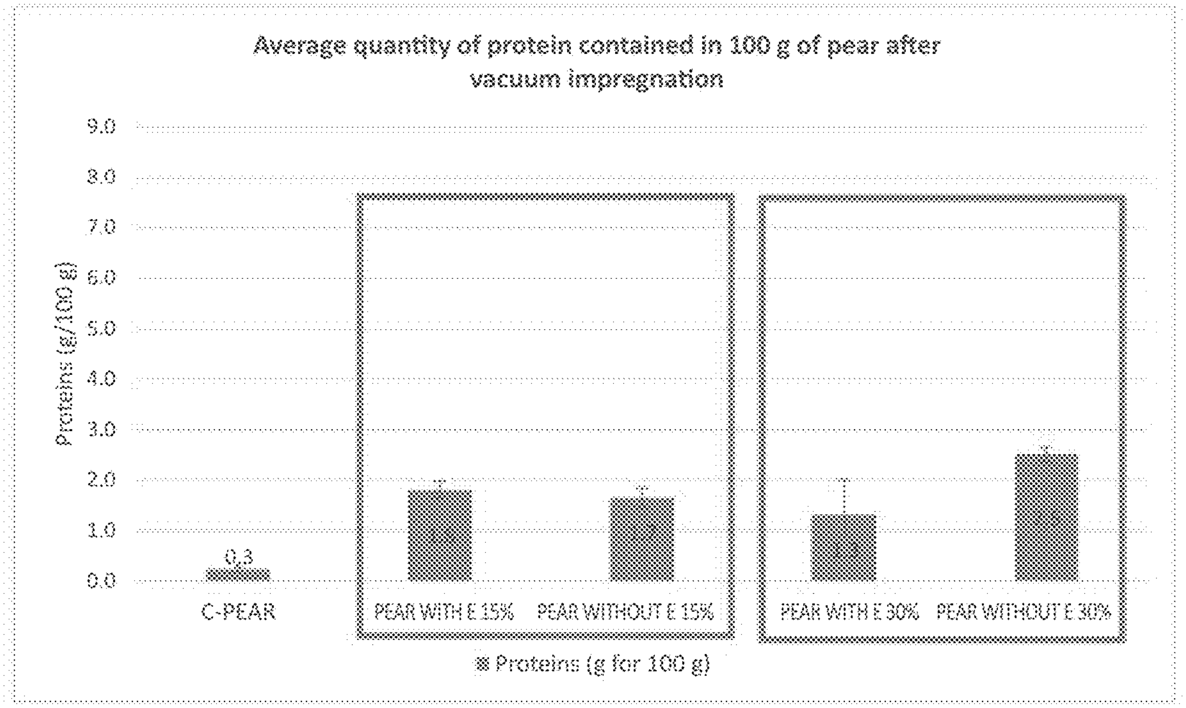
FIG. 2*b*: Pieces of raw pear, impregnated with:
- untreated: control (on the left)
- a protein solution diluted to 15% with emulsifier (with E) and without emulsifier (without E) (middle) and
- a protein solution diluted to 30% with emulsifier (with E) and without emulsifier (without E) (on the right).

FIG. 2B shows the average quantity of protein present in the different pear samples having been vacuum impregnated with a protein solution diluted to 15% and 30%, with and without emulsifier. They are compared with the control: pear not having been impregnated.

It can be seen that the pear samples after vacuum impregnation all contain more proteins than the control. That which contains the most thereof is PEAR WITHOUT E 30%, that is to say the pear samples having been impregnated in a protein solution diluted to 30% without emulsifier. It is also observed that the pear control is a fruit low in protein. The vacuum impregnation of pears with a protein solution causes an increase in the protein content.

The data were processed as a function of the energy value in order to visualise the possibility or not of making a nutritional claim: the results are shown in FIG. 3B.

All the pear samples vacuum impregnated with a protein solution meet the conditions necessary to make the nutritional claim "source of proteins".

Kiwi

Figure 2C:
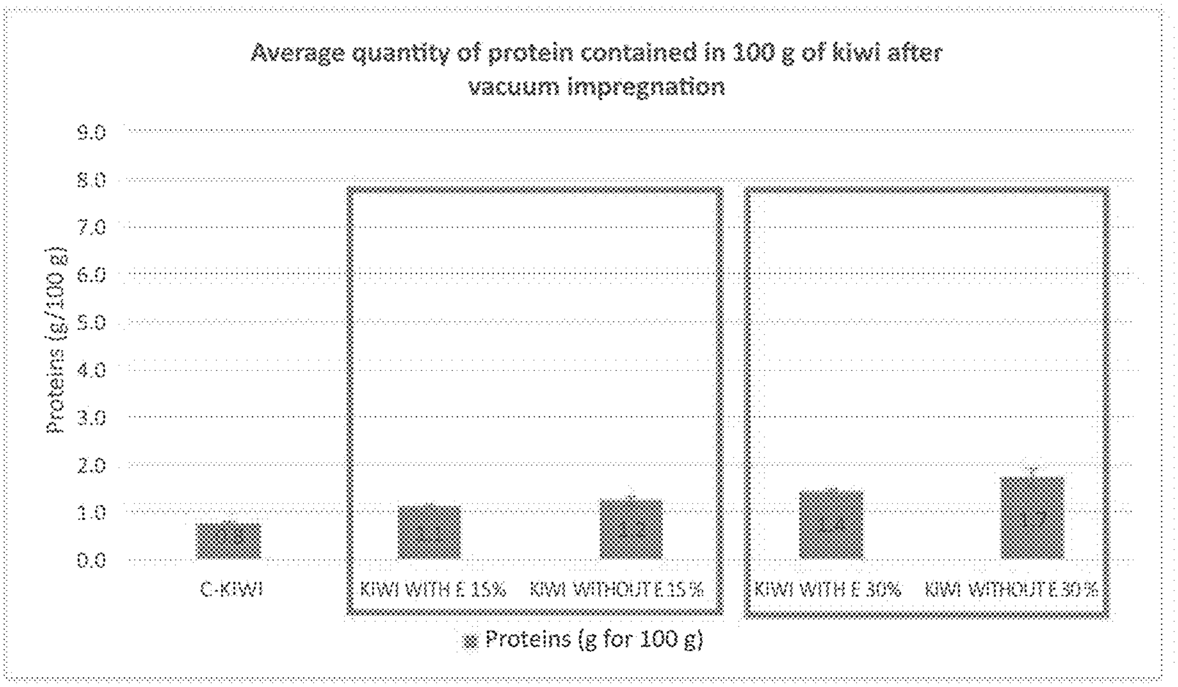
FIG. 2*c*: Pieces of raw kiwi, impregnated with:
- untreated: control (on the left)
- a protein solution diluted to 15% with emulsifier (with E) and without emulsifier (without E) (middle) and
- a protein solution diluted to 30% with emulsifier (with E) and without emulsifier (without E) (on the right).

FIG. 2C shows the average quantity of protein present in the different samples of kiwi having been vacuum impregnated with a protein solution diluted to 15% and 30%, with and without emulsifier. They are compared with the control: kiwi not having been impregnated.

The kiwi samples after vacuum impregnation all contain more proteins than the control. That which contains the most thereof is KIW WITHOUT E 30% that is to say, the samples of kiwi having been impregnated in a protein solution diluted to 30% without emulsifier.

The control is a fruit low in protein. The vacuum impregnation of kiwis with a protein solution causes an overall increase in the protein content.

The data were next processed as a function of the energy value in order to visualise the possibility or not of making a nutritional claim: the results are shown in FIG. 3C.

According to these results, only the kiwi samples having been impregnated in a protein solution diluted to 30% without emulsifier can make the nutritional claim "source of proteins".

Clementine

Figure 2D:
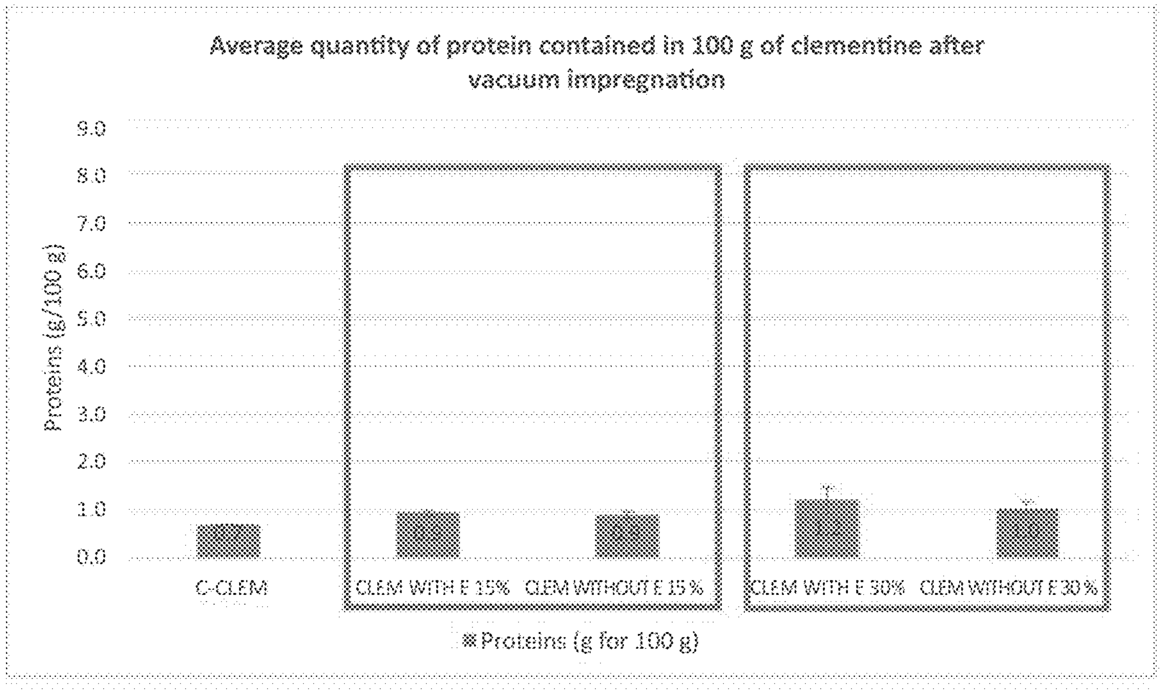
FIG. 2*d*: Pieces of raw clementine, impregnated with:
- untreated: control (on the left)
- a protein solution diluted to 15% with emulsifier (with E) and without emulsifier (without E) (middle) and
- a protein solution diluted to 30% with emulsifier (with E) and without emulsifier (without E) (on the right).

FIG. 2D shows the average quantity of proteins present in the different clementine samples having been vacuum impregnated with a protein solution diluted to 15% and 30%, with and without emulsifier. They are compared with the control: clementine not having been impregnated.

The clementine samples after vacuum impregnation all contain more proteins than the control. The mass gain remains however very low: between 0.2 g and 0.5 g on average.

The control is a fruit low in protein. The vacuum impregnation of clementines with a protein solution causes an overall increase in the protein content.

The data were processed as a function of the energy value in order to visualise the possibility or not of making a nutritional claim: the results are shown in FIG. 3D.

Although no sample meets at this stage the conditions for attributing the nutritional claims "source of proteins" or "rich in proteins", probably because the samples tested contained the skin of the fruit, the vacuum impregnation of clementines enables an overall increase in the protein content. To improve the efficiency of the impregnation, samples of clementine without skin will be tested.

Cucumber

Figure 2E:
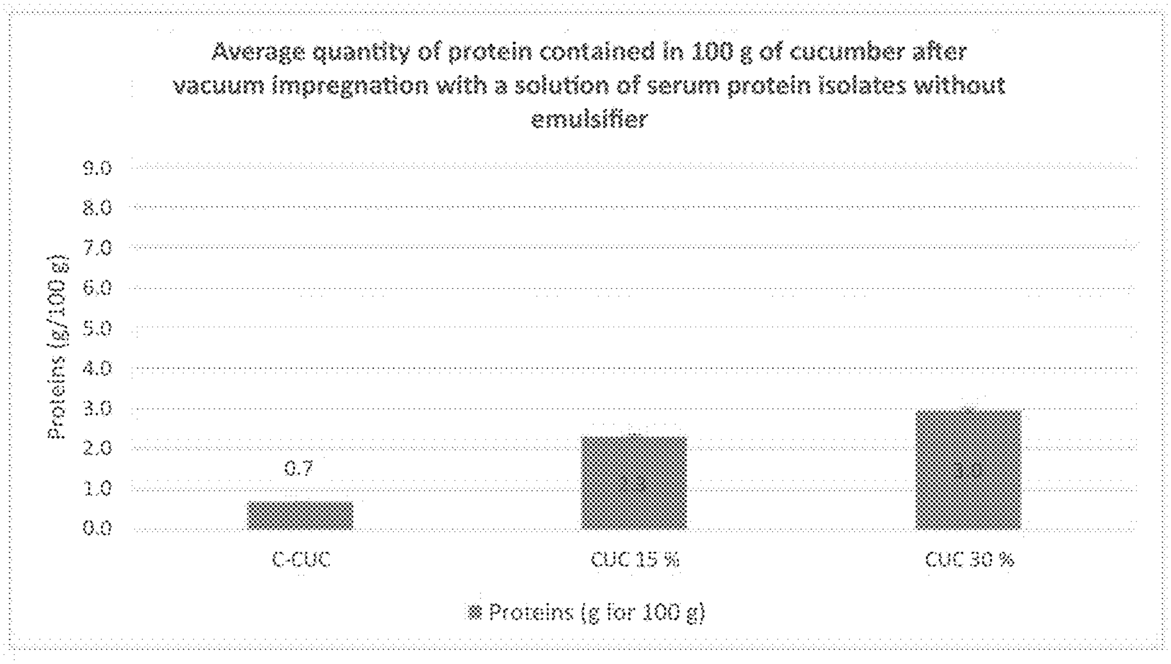
FIG. 2*e*: Pieces of raw cucumber, impregnated with:
- untreated: control (on the left)
- a protein solution diluted to 15% (middle) and
- a protein solution diluted to 30% (on the right).

FIG. 2E shows the average quantity of protein present in the different cucumber samples having been vacuum impregnated with a protein solution diluted to 15% and 30% without emulsifier. They are compared with the control: untreated cucumber not having been impregnated.

The cucumber samples after vacuum impregnation all contain more proteins than the control. The mass gain is 3 to 4 times greater than the initial quantity of protein with on average an increase from 1.6 g to 2.3 g.

The vacuum impregnation of cucumbers with a protein solution without emulsifier leads to an overall increase in the protein content.

The data were processed as a function of the energy value in order to visualise the possibility or not of making a nutritional claim: the results are shown in FIG. 3E.

The cucumber samples vacuum impregnated with a protein solution meet the conditions necessary to make the nutritional claims "source of proteins" and "rich in proteins".

Chicory

Figure 2F:
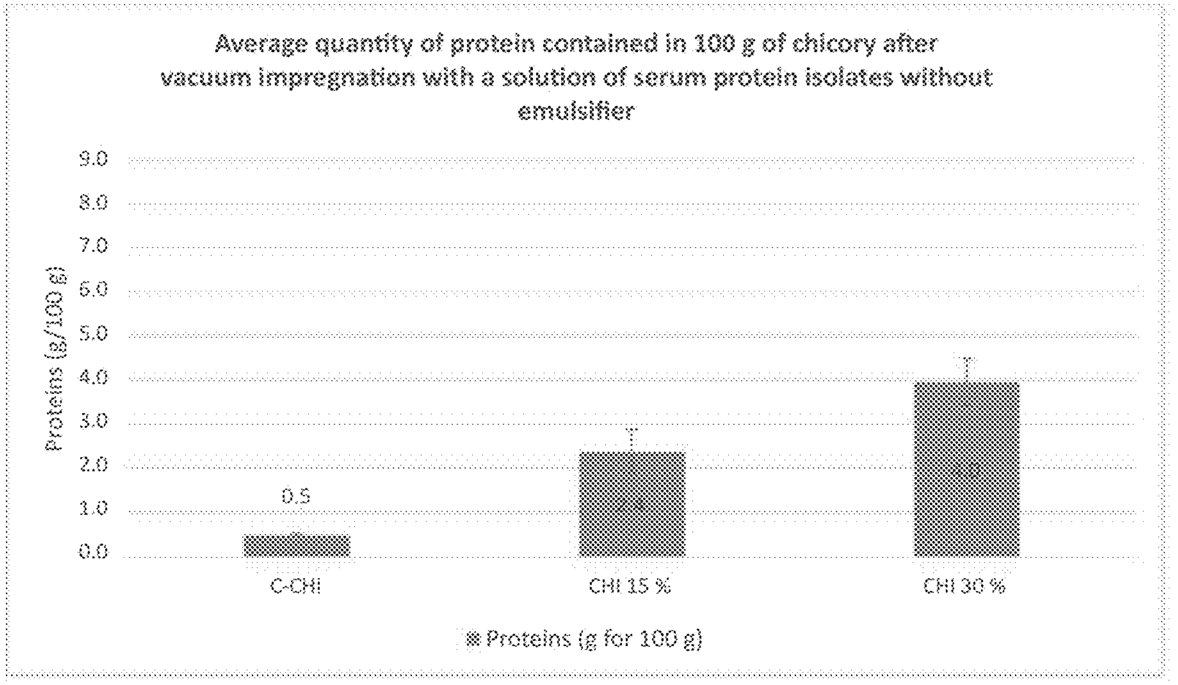
FIG. 2*f*: Pieces of raw chicory, impregnated with:
- untreated: control (on the left)
- a protein solution diluted to 15% (middle) and
- a protein solution diluted to 30% (on the right).

FIG. 2F shows the average quantity of protein present in the different chicory samples having been vacuum impregnated with a protein solution diluted to 15% and 30% without emulsifier. They are compared with the control: chicory not having been impregnated.

The chicory samples after vacuum impregnation all contain more proteins than the control. The mass gain is notable with on average an increase from 1.9 g to 3.5 g.

The vacuum impregnation of chicories with a protein solution without emulsifier leads to an overall increase in the protein content.

The data were processed as a function of the energy value in order to visualise the possibility or not of making a nutritional claim: FIG. 3F shows the results obtained.

The chicory samples vacuum impregnated with a protein solution meet the conditions necessary to make the nutritional claims "source of proteins" and "rich in proteins".

Courgette

Figure 2G:
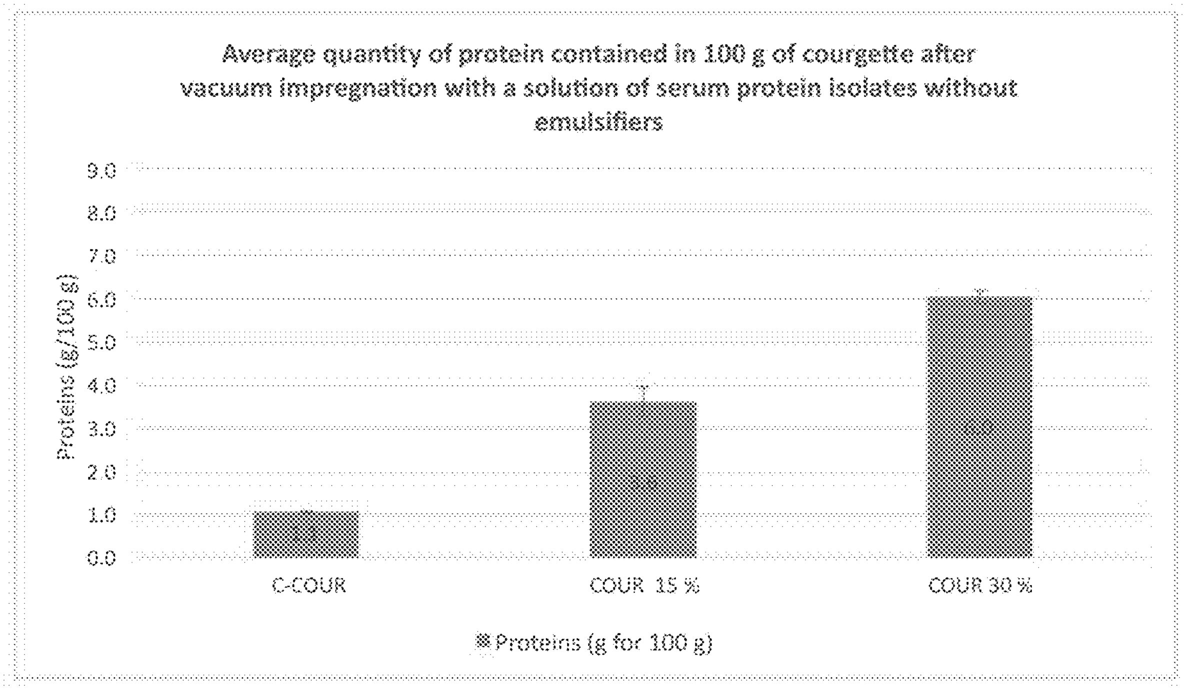
FIG. 2*g*: Pieces of raw courgette, impregnated with:
- untreated: control (on the left)
- a protein solution diluted to 15% (middle) and
- a protein solution diluted to 30% (on the right).

FIG. 2G shows the average quantity of protein present in the different courgette samples having been vacuum impregnated with a protein solution diluted to 15% and 30% without emulsifier. They are compared with the control: courgette not having been impregnated.

The courgette samples after vacuum impregnation all contain more proteins than the control. The mass gain is notable with on average an increase from 2.5 g to 4.9 g.

The vacuum impregnation of courgettes with a protein solution without emulsifier leads to an overall increase in the protein content.

The data were processed as a function of the energy value in order to visualise the possibility or not of making a nutritional claim.

The courgette samples vacuum impregnated with a protein solution meet the conditions necessary to make the nutritional claims "source of proteins" and "rich in proteins", as is shown in FIG. 3G.

Conclusion

The study shows the relevant character of the method for protein vacuum impregnation to modify the nutritional profile of foods.

Example 5. Results of Vacuum Impregnation with Zeolites

1. Preliminary Test

The apple was chosen as standard matrix, in so far as it is constituted a well-defined spongy tissue. It is used in the form of slices 3 mm thick in this preliminary study.

Whatever the concentration made, the solution decants in 10 minutes. It is thus necessary to use it rapidly after agitation.

The results are shown in the two respective tables 4 and 5.

The strong weight gain observed in the control sample (0% Zeolite) is due uniquely to the absorption of water. The slices are transparent and soft when bitten. In the solutions containing Zeolite, the water enters much less easily, this phenomenon being observable from the low concentration of 2.5%. The threshold of 5% of Zeolite marks a notable change, whatever the type of Zeolite used. At this concentration, the slices of fruit recover their visual "thickness", due to the opacity created by the entry of Zeolite which stops light. The slices of apple are crunchy. The more the water is loaded with Zeolite, the more the weight increases. Everything leads to believe that the weight gain is linked to the integration of Zeolite.

The impregnation of Zeolite finds its limits in the grey-green colour and the loss of luminance at concentrations greater than 5%. This is accompanied by a crunchiness that crunches when bitten.

TABLE 4

Apple
JMT zeolite: very fine white coloured powder
1 Feb. 2019
1 single test per series (preliminary study)

| Weight of apple in slices 3 mm thick (g) | Total volume of solution covering the apple (g) | Weight of Zeolite (g) | Weight of water (e) | Weight gain after process (g) | Taste observation | Visual observation of the slices |
|---|---|---|---|---|---|---|
| 50 | 100 | 0 | 100 | 65.7 | Washed out fruit flavour, soft slices | Translucid |

TABLE 4-continued

| Apple<br>JMT zeolite: very fine white coloured powder<br>1 Feb. 2019<br>1 single test per series (preliminary study) | | | | | | |
|---|---|---|---|---|---|---|
| Weight of apple in slices 3 mm thick (g) | Total volume of solution covering the apple (g) | Weight of Zeolite (g) | Weight of water (e) | Weight gain after process (g) | Taste observation | Visual observation of the slices |
| 50 | 100 | 2.5 | 97.5 | 59 | Flavour of the fruit partially found again, appearance of slight crunchiness | Slight opacity |
| 50 | 100 | 5 | 95 | 63 | Flavour of the fruit more marked and crunchiness more apparent | Opacity more marked without bothersome colour |
| 50 | 100 | 10 | 90 | 67.2 | Mineral crunchiness but disappearance of the fruit flavour | Opaque, whitish slices, not very attractive |
| 50 | 100 | 20 | 50 | | | |

Preliminary Test with NatureForme Zeolite

TABLE 5

| Apple<br>Zeolite: very fine powder with grey-greenish colour<br>25 Jan. 2019<br>1 single test per series (preliminary study) | | | | | | |
|---|---|---|---|---|---|---|
| Weight of apple in slices 3 mm thick (g) | Total volume of solution covering the apple (g) | Weight of Zeolite (g) | Weight of water (e) | Weight gain after process(g) | Taste observation | Visual observation of the slices |
| 50 | 100 | 0 | 100 | 66 | Washed out fruit flavour, soft slices | Translucid |
| 50 | 100 | 2.5 | 97.5 | 58.7 | Flavour of the fruit partially found again, appearance of a slight crunchiness | Slight opacity |
| 50 | 100 | 5 | 95 | 60.5 | Flavour of the fruit more marked and crunchiness more apparent | Opacity more marked and slight grey colour |
| 50 | 100 | 10 | 90 | 62.5 | Impression of eating a cockle without the sand removed | Grey-greenish slices, not very attractive |
| 50 | 100 | 20 | 80 | 63 | Impression of eating a cockle without the sand removed | Grey-greenish slices, not very attractive |

Preliminary Test with Zeo-Medic Zeolite

2. Conclusion of the Preliminary Test with Zeolite

The Zeolite supplied by Zeo-Medic is preferred for its finer particle size and its more discrete colour. Food matrices that would best accept crunchiness could be those conventionally used in "deeping" such as radish, cucumber, or instead gherkin. As a reminder, gherkins are conventionally supplemented with calcium carbonate ($CaCO_3$), precisely to reinforce their crunchiness.

3. In-Depth Tests

The foods used are peeled and cut into sticks or quarters before experimental implementation according to the conditions described previously.

Table 6 below summarises the essential data of the study.

TABLE 6

| | Food matrix (on 50 g fresh) | Mass of dry matter after desiccation (g) | Dry matter (%) of the product employed | Net gain of dry matter with zeolite (%) | Portion necessary to provide 5 g of zeolite |
|---|---|---|---|---|---|
| Non-impregnated control | Courgette | 1.857 | 3.7 | | |
| Impregnation of water | | 1.861 | 3.7 | | |

TABLE 6-continued

| | Food matrix (on 50 g fresh) | Mass of dry matter after desiccation (g) | Dry matter (%) of the product employed | Net gain of dry matter with zeolite (%) | Portion necessary to provide 5 g of zeolite |
|---|---|---|---|---|---|
| Impregnation of 5% zeo water | | 2.603 | 5.2 | 28.5 | 167 |
| Non-impregnated control | Golden delicious apple | 6.177 | 12.4 | | |
| Impregnation of water | | 6.175 | 12.4 | | |
| Impregnation of 5% zeo water | | 6.918 | 13.8 | 10.7 | 169 |
| Non-impregnated control | Cucumber | 1.638 | 3.3 | | |
| Impregnation of water | | 1.68 | 3.4 | | |
| Impregnation of 5% zeo water | | 2.105 | 4.2 | 20.2 | 312 |
| Non-impregnated control | Long horseradish | 3.637 | 7.3 | | |
| Impregnation of water | | 3.906 | 7.8 | | |
| Impregnation of 5% zeo water | | 4.147 | 8.3 | 5.9 | 500 |
| Non-impregnated control | Red ball radish | 2.414 | 4.8 | | |
| Impregnation of water | | 2.33 | 4.7 | | |
| Impregnation of 5% zeo water | | 2.47 | 4.9 | 5.6 | 1250 |
| Non-impregnated control | Sweet gherkin | 2.057 | 4.1 | | |
| Impregnation of water | | 2.125 | 4.2 | | |
| Impregnation of 5% zeo water | | 2.171 | 4.3 | 2.2 | 2500 |

Extraction of essential data on the evolution of the dry matter after vacuum impregnation of a 5% zeolite solution.

Clearly courgette, apple and cucumber make it possible to impregnate a significant quantity of zeolite. With the objective of ingesting 5 g of zeolite, for persons who would have to benefit from a supplementation with this active agent, the consumption of these three foods thus treated is compatible with normal portions. This is not the case with radish or horseradish. The results obtained with gherkin must be put in perspective, because this food is conserved in acidic and salted medium, which has had to stiffen its tissues. All the same it is this product that will be found commercially.

4. Conclusion on the in-Depth Study with Zeolite

In our experimental conditions, using a solution of 5% zeolite in water at neutral pH, we show that it is possible to have available foods enriched at sufficient concentrations to be efficient. Foods other than apple, cucumber or courgette may be candidates, from the moment that they have a spongy texture. On the basis of current knowledge, it is difficult to define a minimum porosity of these foods to be eligible for the technological method.

Example 6. Technical Feasibility of the Operating Mode Aiming to Test the Method of the Invention on a Reference Fruit A preliminary study was carried out on apple by impregnation of Leucine alone or in the presence of PRONATIV® 95 CLINICAL:

Solution with 2.5% of Leucine and 97.6% of water

Solution with 2.5% of Leucine/10% of PRONATIV® 95 CLINICAL and 87.6% of water

Six repetitions were carried out. To 14.5 g (on average) of slices of apples (5 mm thick) are added 20 ml of one of the prepared solutions, passed beforehand for 10 seconds in the blender to homogenise the leucine in the medium.

FIG. 4 shows the evolution of the masses of each sample of apple noted without leucine, with leucine and with leucine+PRONATIV® 95 INSTANT.

It is observed that the impregnation of the slices of apple in a 2.5% leucine solution leads to a significant increase in the mass. These results thus assume that the solution has penetrated into the samples. The nitrogen content is increased 3 times in the samples on average.

It is also remarked that the samples impregnated in a solution of 2.5% leucine and 10% PRONATIV® 95 INSTANT have a mass significantly higher than the samples impregnated in a solution diluted to 2.5% of leucine alone. The nitrogen content is increased 7.5 times.

It should be noted that the addition of citric acid, saccharose, Sucralose, *Stevia* or instead "four spices (clove, muscade, cinnamon, ginger)" to the solution does not change the impregnation kinetics.

PATENT REFERENCES

FR 2 280 328
FR 2 807 955
U.S. Pat. No. 3,843,810
U.S. Pat. No. 4,460,610
FR 1 758 301
FR 3 003 873
FR 2 912 035
U.S. Pat. No. 4,460,610
WO 85/01420

EP 072 263
EP 1 264 546.

BIBLIOGRAPHIC REFERENCES

1. ANSES, 2007. Apport en protéines: consommation, qualité, besoins et recommandations. Available at: <https://www.anses.fr/fr/content/les-prot%C3%A9ines>.
2. DARDEVET, D., et al., 2006. Leucine supplementation improves muscle protein synthesis in elderly men independently of hyperaminoacidaemia. The Physiological Society, volume n° 575, n° 1. p. 305-315.
3. ARENDS J et al., 2017. ESPEN guidelines on nutrition in cancer patients. Clinical Nutr, 36:11-48.
4. POUILLART P, 2017. *Dénutrition en oncologie: la supplémentation protéino-énergétique, oui mais pas seulement. Techniques Hospitalières,* 765:56-58.
5. POUILLART P, 2019. *Quelle alimentation pendant un cancer*. Ed Privat.
6. TZIA, C., ZORPAS, A., 2012. Handbook of Natural Zeolites. Zeolites in Food Processing Industries.

The invention claimed is:

1. A method for enriching a food matrix with peptide(s) and/or with protein(s), comprising the following steps:

obtaining a food matrix from plant origin permeable to liquids wherein the food matrix is a fruit or a vegetable or a marine plant that has not undergone any heat treatment;

placing said food matrix in contact with an impregnation solution composed of a liquid, comprising one or more peptide(s) and/or one or more protein(s), and optionally one or more isolated amino acid(s) and/or one or more zeolite and/or one or more plant(s) and/or one or more spice(s) and/or one or more aroma(s);

impregnating said food matrix with said one or more peptide(s) and/or one or more protein(s), by applying an under-pressure comprised between 5 and 20 millibars to the food matrix in contact with said impregnation solution to generate an enriched food matrix, wherein the enriched food matrix meets the conditions necessary to make the nutritional claim "source of proteins", and wherein the impregnation solution comprises 15-30% of a native serum protein isolate, obtained by membrane filtration of cow's milk.

2. The method according to claim 1, for the preparation of a food having an enhanced nutritional value compared to the original nutritional value of said food, and/or enriched with nutrients having a beneficial activity for the health of organisms.

3. The method according to claim 1, wherein the food matrix has been scalded beforehand.

4. The method according to claim 1, wherein the liquid is selected from the group consisting of: a water, an oil, a syrup, a milk, a fruit juice, a vegetable juice, and any mixture thereof.

5. The method according to claim 1, wherein the impregnation solution comprises both: (i) one or more peptide(s) and/or one or more protein(s), and (ii) one or more isolated amino acid(s) and/or zeolite.

6. The method according to claim 5, wherein the one or more isolated amino acid(s) are selected from isolated amino acids essential for humans.

7. The method according to claim 5, wherein the one or more isolated amino acid(s) are selected from: leucine, isoleucine, valine, glutamine, arginine and citrulline.

8. The method according to claim 1, wherein the protein content of the native serum protein isolate, on dry weight, is at least 95 g for 100 g of dry product.

9. The method according to claim 1, wherein the step of impregnating said food matrix by applying an under-pressure lasts between 10 and 60 seconds, and is followed by a rise in pressure up to atmospheric pressure.

10. The method according to claim 1, wherein the step of impregnating said food matrix by applying an under-pressure is carried out by means of a vacuum packing machine.

11. The method according to claim 1, wherein after the step of impregnating said food matrix by applying an under-pressure, the food matrix is wiped and/or drained and/or dried.

12. The method of claim 1, wherein the quantity of peptide(s) and/or protein(s) is determined by measure of total nitrogen content of the food matrix.

13. The method of claim 1, wherein the enriched food matrix impregnated with the protein solution meets the conditions necessary to make the nutritional claim "rich in proteins".

* * * * *